US012745082B2

(12) United States Patent
Gupta et al.

(10) Patent No.: US 12,745,082 B2
(45) Date of Patent: Sep. 22, 2026

(54) GROUP-BASED NETWORK ACCESS VIA NETWORK DEVICE

(71) Applicant: Arista Networks, Inc., Santa Clara, CA (US)

(72) Inventors: Anubhav Gupta, Navi Mumbai (IN); Venkata Ramchandra Murthy Jonnalagadda, Fremont, CA (US); Rajesh Kumar Ganapathy Achari, Perumbavoor (IN); Venkatesh Ramachandran, Bengaluru (IN); Anoop Kumaran Nair, Thrikkakara (IN); Rajarao Bhagya Prasad Nittur, Milpitas, CA (US); Krishna Prabhakar, Los Altos Hills, CA (US)

(73) Assignee: Arista Networks, Inc., Santa Clara, CA (US)

( * ) Notice: Subject to any disclaimer, the term of this patent is extended or adjusted under 35 U.S.C. 154(b) by 229 days.

(21) Appl. No.: 18/473,994

(22) Filed: Sep. 25, 2023

(65) Prior Publication Data

US 2025/0106629 A1 Mar. 27, 2025

(51) Int. Cl.
*H04W 12/069* (2021.01)
*H04W 12/0431* (2021.01)

(52) U.S. Cl.
CPC ..... *H04W 12/069* (2021.01); *H04W 12/0431* (2021.01)

(58) Field of Classification Search
CPC ........... H04W 12/069; H04W 12/0431; H04W 12/041
See application file for complete search history.

(56) References Cited

U.S. PATENT DOCUMENTS

2015/0195261 A1 7/2015 Gehrmann et al.
2015/0195699 A1 7/2015 Naka et al.
2017/0374548 A1* 12/2017 Mason .................. H04L 63/062
2019/0020636 A1* 1/2019 Gehring ................ H04L 9/0833
2021/0050999 A1* 2/2021 Huang .................... H04L 9/088
2022/0225097 A1* 7/2022 Campiglio .......... H04W 12/041
2023/0135840 A1 5/2023 Vuggrala et al.
2023/0308870 A1 9/2023 Divvi et al.
2024/0146512 A1* 5/2024 Yang ..................... H04L 9/3242
2024/0214802 A1* 6/2024 Gupta .................. H04L 63/065

OTHER PUBLICATIONS

C. Rigney et al., Remote Authentication Dial In User Service (RADIUS), Network Working Group, Apr. 1997, pp. 1-65, rfc-editor.
U.S. Appl. No. 18/087,218, filed Dec. 22, 2022.

* cited by examiner

*Primary Examiner* — Margaret G Webb
(74) *Attorney, Agent, or Firm* — Treyz Law Group, P.C.; Tianyi He

(57) ABSTRACT

Client devices in the same device group may use the same group-specific key to perform a key exchange operation with access point(s) to obtain network access. A network access management server may provide centralized management of different device groups each being associated with a different group-specific key during the life cycles of the device groups. An access point may communicate with the network access management server to obtain the group-specific key to assist in authenticating network access of a connecting client device.

20 Claims, 15 Drawing Sheets

GROUP-BASED NETWORK ACCESS VIA NETWORK DEVICE

BACKGROUND

A communication system includes multiple network devices that are interconnected to form a network for conveying network traffic from source host devices to destination host devices. Host devices can belong to different users. It may be desirable to securely manage network access to the network by host devices of different users.

DETAILED DESCRIPTION

A network can convey network traffic, e.g., in the form of frames, packets, etc., for host devices belonging to different users. Each user may have a corresponding set of host devices coupled to network devices such as wireless access points in the network and, through these network devices, may be connected to other network portions such as the Internet, a secure enterprise network, and/or networking resources (e.g., computing resources, storage resources, printers, displays, etc., on the network). In other words, these network devices may form an edge portion of a local area network or a campus area network through which the rest of the network (e.g., the Internet) is accessible to the connected host devices.

To facilitate secure access to the network, each user may be assigned or generally associated with a unique (user-specific) key (e.g., a unique pre-shared key (UPSK)) usable to authenticate network access for host devices of the user. In particular, access point(s) and a network access management server may exchange request and response messages to provide the access point(s) with the unique key to authenticate network access of a host device of the user. In some illustrative arrangements, the use of these different user-specific keys, each unique to a different user, may help to provide isolation (e.g., through the limiting of direct data link layer (L2) communication) between host devices belonging to different users and/or generally between host devices in different host device groups (e.g., when the device groups are not user-based).

To properly authenticate host devices when communicating with the access point, the network access management server may maintain host device groups (e.g., a host device group of a user) and a corresponding unique device-group-specific key for each host device group (e.g., a user-specific key where the host devices in the group all belong to the same user). To manage the host device groups and the device-group-specific keys, the network access management server may perform new host device onboarding, may perform new device group onboarding (e.g., user onboarding), and/or may perform user authentication locally and/or by facilitating user authentication using an external user authentication service. Based on receiving at least a portion of the information (e.g., the unique key) maintained on the network access management server, an access point may perform and complete a key exchange operation with the host device to authorize network access of the host device. Depending on the authentication scheme associated with the network access, the access point may perform a different workflow (e.g., based on Wi-Fi Protected Access 2 (WPA2) or based on Wi-Fi Protected Access 3 (WPA3)) to communicate with the connecting host device and the network access management server.

Figure 1:
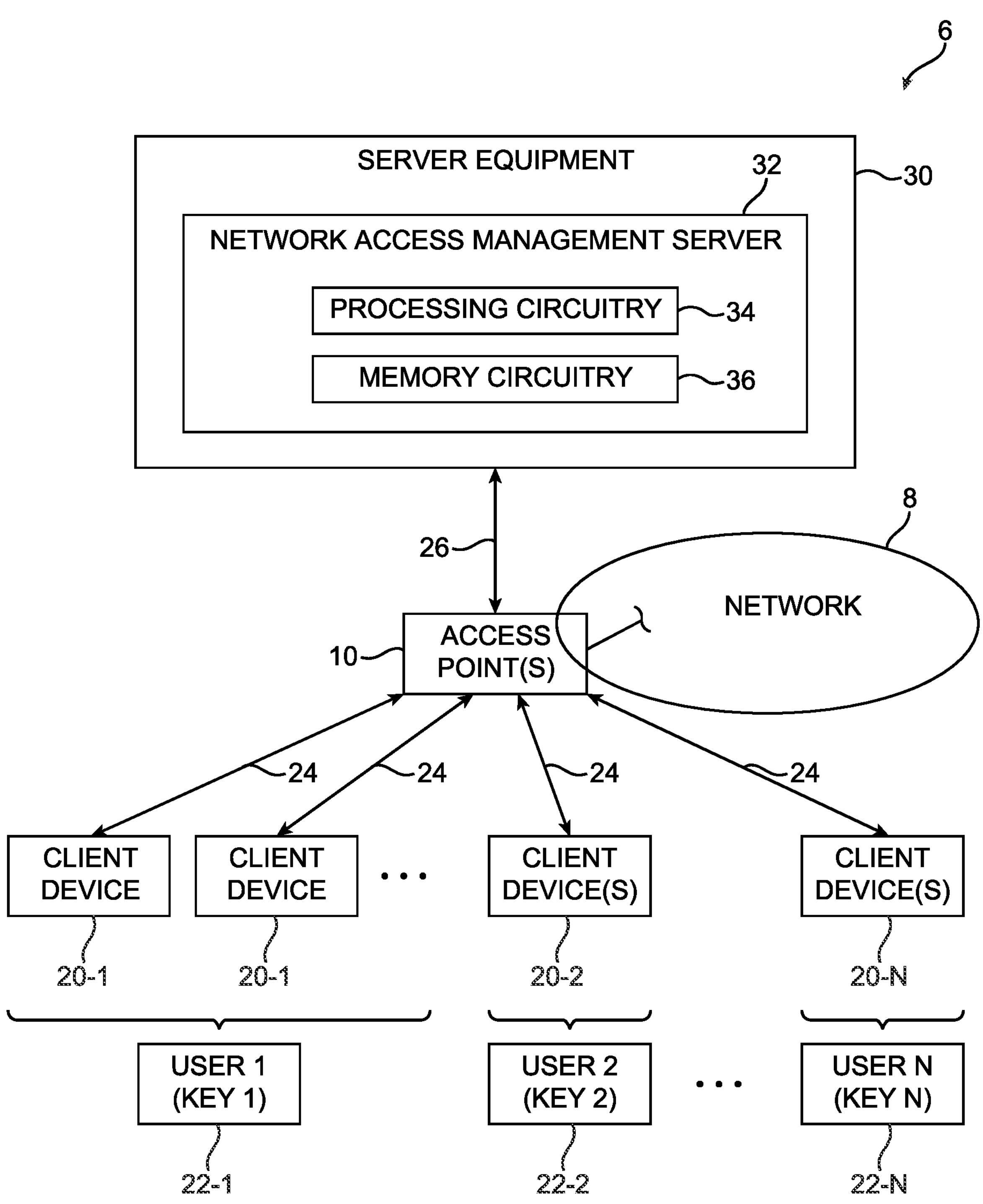
FIG. 1 is a diagram of an illustrative network to which host devices of different device groups can be connected in accordance with some embodiments.

An illustrative networking system configured to handle group-based network access (e.g., using different group-specific keys) is illustrated in FIG. 1. As shown in FIG. 1, networking system 6 may include network 8. Network 8 may be of any suitable scope (e.g., implemented as a campus area network, as a local area network (LAN), as a virtual local area network (VLAN) domain, etc.). As an example, network 8 may include a wired network portion based on wired technologies or standards such as Ethernet (e.g., using copper cables and/or fiber optic cables) and a wireless network portion such as wireless local area network (WLAN) or Wi-Fi networks. If desired, network 8 may also include internet service provider networks (e.g., the Internet) or other public service provider networks, private service provider networks (e.g., multiprotocol label switching (MPLS) networks), and/or many other types of networks such as telecommunication service provider networks (e.g., a long-term evolution (LTE) network).

Network 8 may be implemented using one or more network devices 10 that handle network traffic for conveying information for user applications and/or other processes between different end hosts. In general, network 8 can include networking equipment forming a variety of network devices 10 that interconnect end host devices 20 of network 8. Network devices 10 may include one or more wireless access points, one or more switches, one or more bridges, one or more routers, one or more hubs, one or more repeaters, one or more firewalls, one or more devices serving other networking functions, one or more devices that include the functionality of two or more of these devices, and management equipment that manage and control the operation of one or more of these network devices. Host devices 20 can include computers, servers, portable electronic devices such as cellular telephones, laptops, etc., any other suitable types of specialized or general-purpose host computing equipment, e.g., each running one or more client-side and/or server-side applications, network-connected appliances or devices such as cameras, thermostats, wireless sensors, medical or health sensors, or other sensors, lighting fixtures, speakers, printers, or other output devices, controllers or other input devices, and other network-connected equipment that serve as input-output devices and/or computing devices in the distributed networking system, devices used by network administrators (sometimes referred to as administrator devices), network service devices, management equipment that manage and control the operation of one or more of other host devices 20 and/or network devices 10.

Configurations in which network 8 includes one or more wireless access points 10 that implement a wireless portion of network 8 are sometimes described herein as an illustrative example. In these configurations, host devices 20 are sometimes referred to as client devices 20 (e.g., devices that connect to network 8 via wireless access points 10).

These client devices 20 may be organized in device groups. In the example of FIG. 1, each device group contains a group of client devices 20 belonging to the same user 22 (e.g., devices 20-1 belonging to user 22-1, devices 20-2 belonging to user 22-2, . . . , devices 20-N belonging to user 22-N). Each user 22 may have any suitable number of client devices 20. Each user may also be assigned or generally associated with a unique user-specific key (e.g., a unique pre-shared key (UPSK)) used to access network 8 via access point 10. In particular, each of a user's client device 20 may be configured to connect to network 8 using the same user-specific key (e.g., the same UPSK).

More explicitly, a first user 22-1 may be associated with a first user-specific key unique to user 22-1, a second user 22-2 may be associated with a second user-specific key unique to second user 22-2, and generally an Nth user 22-N may be associated with a Nth user-specific key unique to Nth user 22-N. To obtain network access to network 8, each client device 20-1 of user 22-1 may perform a message exchange operation with wireless access point 10 using the first user-specific key to authenticate itself for network access. To obtain network access to network 8, each client device 20-2 of user 22-2 may perform a message exchange operation with wireless access point 10 using the second user-specific key to authenticate itself for network access. Generally, to obtain network access to network 8, each client device 20-N belonging to user 22-N may perform a message exchange operation with wireless access point 10 using the Nth user-specific key to authenticate itself for network access.

Each client device 20 may wirelessly connect to the same or different access points 10 to connect to the rest of network 8. Regardless of the access point 10 to which each client device 20 is connected, the same user-specific key may be used to authenticate the client device for network access or generally cause the network connection to be authorized. In other words, each of wireless communications links 24 between a client device 20 and a corresponding access point 10 may be established based on an authentication process using a user-specific (or generally device-group-specific) key.

To assist in the authentication of client devices for network access, the authentication of user identity, and/or to generally assist in the authorization of network access of client devices 20 to network 8, networking system 6 may include one or more servers implemented on server equipment 30. An illustrative server implemented on server equipment 30 may be network access management server 32. Network access management server 32 may be formed from any suitable number of compute devices on server equipment 30 and any suitable number of storage devices on server equipment 30, among other elements of equipment 30 such as input-output interfaces, power management circuitry, thermal management circuitry, etc. Compute devices for implementing server 32 may generally be referred to herein as processing circuitry 34 and storage devices for implementing server 32 may generally be referred to herein as memory circuitry 36.

In particular, server equipment 30 may include server hardware such as one or more blade servers, one or more rack servers, and/or one or more tower servers. Configurations in which server equipment 32 includes one or more rack servers mounted to racks of a server chassis or enclosure are sometimes described herein as an illustrative example. Each of the compute devices for processing circuitry 34 and/or each of the storage devices for memory circuitry 36 may be provided as part of the server hardware (e.g., as part of the rack servers).

Processing circuitry 34 (e.g., the compute devices of server equipment 30) may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures. Memory circuitry 36 (e.g., the storage devices of server equipment 30) may include non-volatile memory (e.g., flash memory or other electrically-programmable read-only memory configured to form a solid-state drive), volatile memory (e.g., static or dynamic random-access memory), hard disk drive storage, solid-state storage, and/or other storage circuitry.

More specifically, memory circuitry 36 may include non-transitory (tangible) computer-readable storage media that stores the operating system software and/or any other software code, sometimes referred to as program instructions, software, data, instructions, or code. Processing circuitry 34 may run (e.g., execute) an operating system and/or other software/firmware that is stored on memory circuitry 36 to perform desired operations of server 32. In such a manner, server equipment 30 may implement one or more services, one or more software servers, and/or other software features to collectively perform the functions of network access management for server 32 and/or the functions of other servers implemented thereon. As described herein, server 32 refers to the underlying server (hardware) equipment and/or the server software (e.g., services) executed thereon to perform the operations of server 32.

While server 32 is described herein as being configured to authenticate network access of client device(s) 20 and/or authenticate identities of user(s) 22 (e.g., by performing device and user onboarding, by performing generation and storage of user and device information along with unique keys, by communicating with access points 10 to perform network access authorization, etc.), this is merely illustrative. If desired, server 32 may be configured to additionally perform numerous other functions such as provide network policy reception, definition, and enforcement, natural language query, processing, and response, network-connected device profiling, predictive failure event handling, public key infrastructure (PKI), interfacing and integration services with external applications and/or servers, as just a few examples. In general, server 32 may perform any suitable functions for network access control and management.

Server 32 may provide network access management operations for network 8 by communicating with network devices 10 such as access points 10 via communication paths 26. In particular, after a client device 20 initiates communication with an access point 10 via a given (wireless) communication path 24, access point 10 may further communicate with server 32 via communication path 26 to authenticate the client device 20 by providing a group-based key based on which sessions keys for the wireless connection between client device 20 and access point 10 are derived.

In illustrative configurations described herein, edge network devices 10 of network 8 may be implemented with wireless access points 10. Accordingly, communication paths 24 may be implemented as a wireless communication link between respective wireless communication circuitry on client device 20 and access point 10. This provides a wireless connection to a wireless network portion of network 8 implemented using access points 10. Communication path 26 may be implemented using a Remote Authentication Dial-In User Service (RADIUS) protocol without or with Transport Layer Security (TLS) encryption (e.g., a RadSec protocol when implemented with TLS encryption). If desired, communication path 26 may use other secure protocols for establishing a connection between server 32 and access point 10. As specific examples, server 32 may communicate with one or more access points 10 by conveying information in access accept message or in separate messages based on other (non-RADIUS) protocols for conveying data such as a message conveyed using an application programming interface (API) (e.g., in response to an API call (request)), a message conveyed using Remote Procedure Calls (e.g., gRPC), etc. Configurations in which information is conveyed between server 32 and one or more access points 10 using messages as part of the RADIUS protocol (e.g., a RadSec protocol) are sometimes described herein as an illustrative example.

While access points 10 are shown in FIG. 1 as being outside of network 8, this is merely illustrative. As described above, access points 10 may form a part of network 8 (e.g., may form a wireless network portion of network 8). Accordingly, if desired, communication path 26 may be formed (at least partly) from network paths in network 8 (e.g., access point 10 may convey network traffic to and receive network traffic from server 32 using a RADIUS protocol through other network devices such as switches, routers, etc., of network 8).

Figure 2:
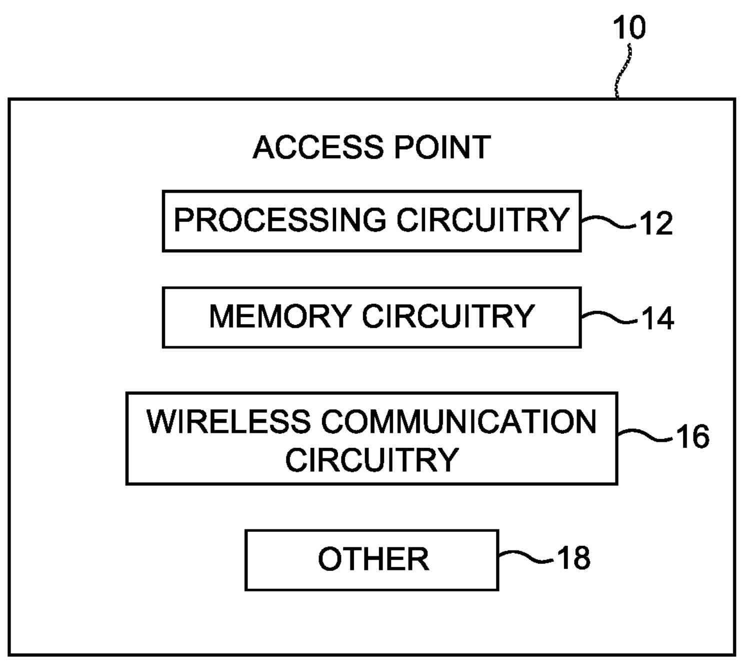
FIG. 2 is a diagram of an illustrative access point in accordance with some embodiments.

FIG. 2 is a diagram of an illustrative hardware configuration for a network device such as access point 10 (FIG. 1). As shown in FIG. 2, access point 10 may include processing circuitry 12, memory circuitry 14, wireless communications circuitry 16, and other components 18 such as input-output interfaces or ports.

Processing circuitry 12 in access point 10 may include one or more processors or processing units based on microprocessors on general-purpose processors, microcontrollers, digital signal processors, programmable logic devices, application specific system processors (ASSPs), application specific integrated circuit (ASIC) processors, etc. Memory circuitry 14 in access point 10 may include volatile memory such as dynamic random-access memory, static random-access memory, etc., and non-volatile memory such as hard-drive storage, solid-state storage, flash memory, etc.

In general, the operations described herein relating to the operation of access point 10 may be stored as (software) instructions on one or more non-transitory computer-readable storage media (e.g., part of memory circuitry 14) in access point 10. The corresponding processing circuitry (e.g., processing circuitry 12) in access point 10 for these one or more non-transitory computer-readable storage media may process the respective instructions to perform the corresponding access point operations. Some portions of processing circuitry 12 and some portions of memory circuitry 14, collectively, may sometimes be referred to herein as the control circuitry of access point 10 because the two are often collectively used to control one or more other components of access point 10 to perform access point functions (e.g., by sending and/or receiving requests, responses, control signals, data, etc.).

Wireless access point 10 may include wireless communication circuitry 16 to wirelessly communicate with client devices 20 and generally provide wireless communication capabilities. Wireless communication circuitry 16 may include one or more radios (e.g., Wi-Fi radios), radio-frequency transceiver circuitry, radio-frequency front-end circuitry, and one or more antennas. The one or more radios may use the one or more antennas to transmit radio-frequency signals to and receive radio-frequency signals from one or more client devices 20 (FIG. 1). While wireless communication circuitry 16 is shown as a separate element from processing circuitry 12, this is merely illustrative. If desired, portions of wireless communication circuitry 16 (e.g., radio functionalities) may be implemented using a portion of processing circuitry 12.

Access point 10 may include other components 18 such as one or more input-output interfaces or ports. As an example, these ports may be Ethernet ports or other types of network interfaces that provided connections to other networking elements (e.g., switches, routers, modems, controllers, servers, client devices, etc.) in network 8, power ports through which power is supplied to access point 10, or other ports. In general, input-output components in access point 10 may provide communication interface components that provide a Bluetooth interface (e.g., one or more antennas), a Wi-Fi interface (e.g., one or more antennas), an Ethernet interface (e.g., one or more Ethernet ports), an optical interface (e.g., one or more optical ports), and/or other networking interfaces for connecting access point 10 to the Internet, a local area network, a wide area network, a mobile network, other types of networks, and/or to another device such as other network device(s) 10, client device(s) 20, peripheral devices, and/or other electronic components.

If desired, other components 18 on access point 10 may include other input-output devices such as devices that provide output to a user such as a display device (e.g., one or more status lights) and/or devices that gather input from a user such as one or more buttons. If desired, other components 18 on access point 10 may include one or more sensors such as radio-frequency sensors. If desired, access point 10 may include other components 18 such as a system bus that couples the internal components of access point 10 to one another, to power management components, etc. In general, each component within access point 10 may be interconnected to the control circuitry (e.g., processing circuitry 12 and/or memory circuitry 14) in access point 10 via one or more paths that enable the reception and transmission of control signals and/or other data.

Figure 3:
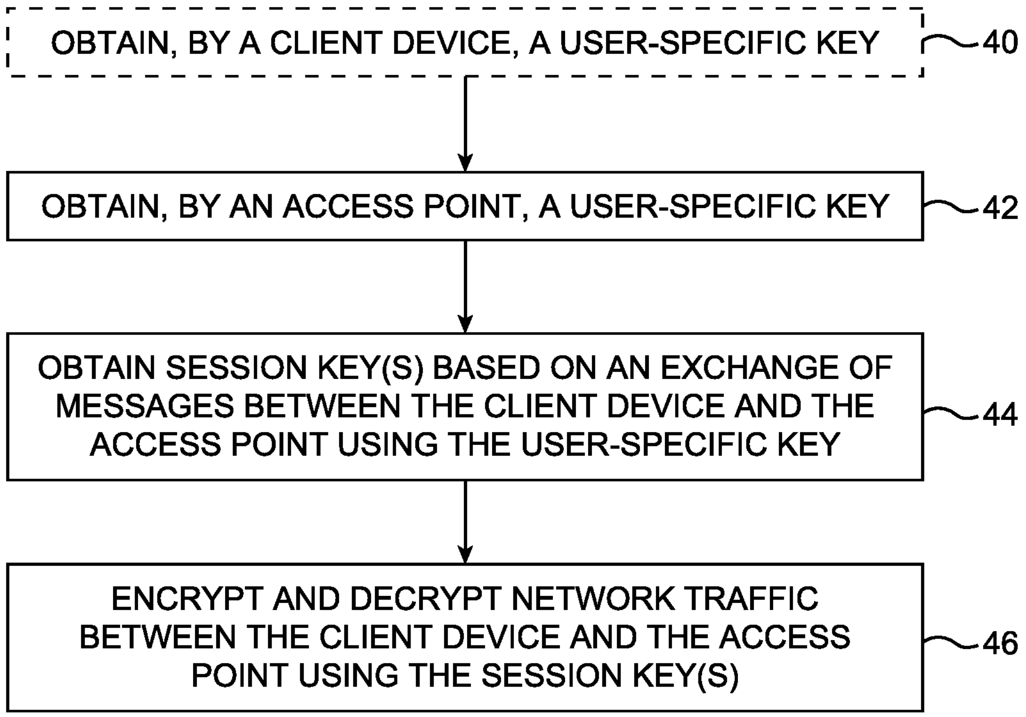
FIG. 3 is a flowchart of illustrative operations for providing network access of a client device to a network via an access point in accordance with some embodiments.

FIG. 3 is a flowchart of illustrative operations for authorizing network access of client devices using user-specific (or more generally device-group-specific) keys. These operations may be performed using access point 10 in FIGS. 1 and 2, client device 20 in FIG. 1, server 32 in FIG. 1, and/or other elements of networking system 6 in FIG. 1.

In configurations described herein as an illustrative example, the operations described in connection with FIG. 3 may be performed by control circuitry in access point 10 (e.g., performed by processing circuitry 12 in access point 10 by executing software instructions stored on memory circuitry 14), performed by control circuitry in client device 20 (e.g., performed by processing circuitry in device 20 by executing software instructions stored on memory circuitry of client device 20), and/or performed by control circuitry in server 32 (e.g., performed by processing circuitry 34 for server 32 by executing software instructions stored on memory circuitry 36). If desired, one or more operations described in connection with FIG. 3 may be performed by other dedicated hardware components in access point 10, client device 20, and server 32.

At block 40, a client device 20 may obtain a user-specific key unique to a user of client device 20 (or generally a device-group-specific key for a device group that includes client device 20). In configuration described herein as an illustrative example, network access management server 32 may be configured to generate the user-specific key and/or provide the user-specific key to client device 20 (via access point 10).

At block 42, an access point 10, as part of a client device authentication process, may obtain the user-specific key to authenticate network access of client device 20 communicatively connected to access point 10. In configuration described herein as an illustrative example, network access management server 32 may be configured to provide the user-specific key to access point 10. However, if desired, one or more (e.g., all) of the operations described herein as being performed by network access management server 32 may be performed locally on access point(s) 10.

At block 44, access point 10 and client device 20 may exchange messages therebetween (e.g., as part of a key exchange operation) using the user-specific key to obtain one or more session keys. One such session key obtained from the key change operation may be a pairwise transient key (PTK) that is derived using the user-specific key. Another session key that may be obtained as part of the key exchange operation (but not derived using the user-specific key) may be a groupwise transient key (GTK). Other operations, in addition to those performed in connection with the key exchange operation, may also be performed as part of the wireless network connection process (e.g., an association operation, an authentication operation, etc.). After the completion of each of these operations, access point 10 may authorize client device 20 for network access (e.g., access to one or more suitable portions of network 8 such as the Internet, a secure enterprise network, one or more networking resources, etc.).

At block 46 (e.g., after network access of client device 20 is authorized by access point 10), access point 10 and client device 20 may encrypt and decrypt network traffic therebetween using the obtained session keys. As examples, client device 20 may encrypt outgoing network traffic using the PTK, may decrypt received unicast network traffic from access point 10 using the PTK, may decrypt received broadcast network traffic from access point 10 using the GTK, etc. Similarly, access point 10 may decrypt outgoing network traffic from client device 20 using the PTK, may encrypt unicast network traffic destined for client device 20 using the PTK, may encrypt broadcast network traffic receivable by client device 20 using the GTK, etc.

As described in connection with blocks 40 and 42 of FIG. 3, network access management server 32 may provide access point 10 with relevant information (e.g., a user-specific key or generally a device-group-specific key) to help manage the authentication of client devices 20. In particular, to enable server 32 to properly make decisions regarding the authentication of client devices 20 for network access, server 32 may store (user) client device group information such as a list of client devices in a client device group that is authorized to connect to network 8, a unique (group-specific) key shared by the list of client devices for network access, group (user) role information and/or other contextual information for the client device group.

Figure 4:
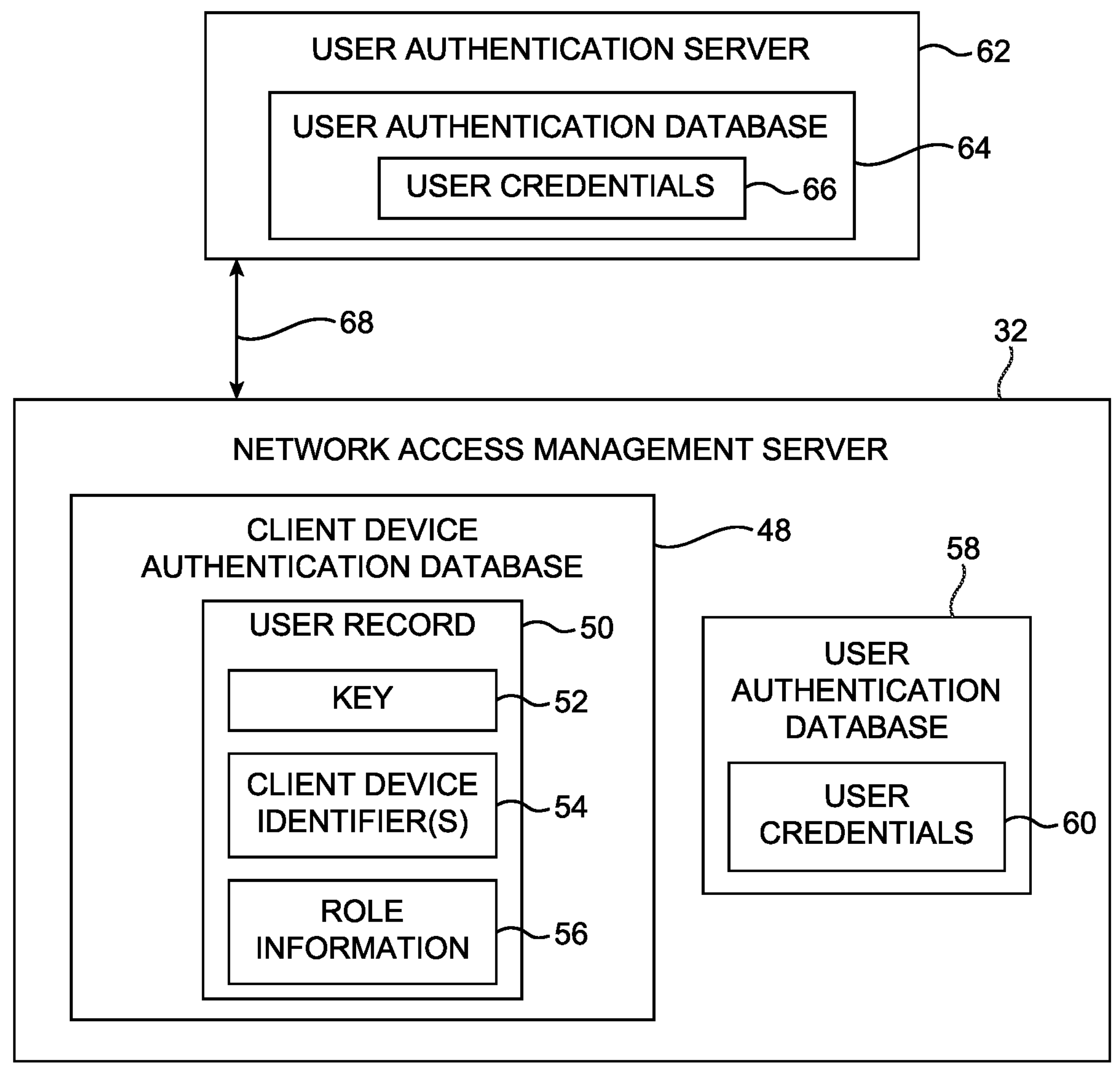
FIG. 4 is a diagram of an illustrative network access management server having access to client device authentication records for authorizing network access in accordance with some embodiments.

FIG. 4 is a diagram of illustrative client device group information that may be stored at, or generally accessible by, server 32. In the example of FIG. 4, server 32 (e.g., memory circuitry 36 in FIG. 1) may store client device authentication database 48. Database 48 may include one or more entries or records 50 each associated with a client device group and having a device-group-specific key unique to that client device group. In the example of FIG. 4, database 48 may store one or more user records 50 each associated with a user 22 and including network access information associated with the user 22.

While the examples of FIGS. 1, 3, and 4 describe client device groups as being user-based (e.g., each client device group containing client devices belonging to a user that share a unique user-specific key), this is merely illustrative. As further detailed in connection with FIG. 11, each group of client devices for which a record exists in database 48 may include client devices 20 that share a unique (device-) group-specific key without these client devices necessarily belonging to the same user or without these device groups being user-centric. Configurations in which records and unique keys are user-based, user-specific, or user-centric are described herein as an illustrative example.

Still referring to the example of FIG. 4, database 48 may include one or more user records 50 each containing information associated with a particular user 22 (FIG. 1). Each user record 50 may include a unique user-specific key 52 that is assigned to, shared with, or generally associated with the particular user 22. Configurations in which keys 52 are unique pre-shared keys (UPSKs) assigned on a per-user basis are sometimes described herein as an illustrative example. Each user record 50 may include a list of client device(s) 20 associated with (e.g., belonging to) the particular user 22 as identified by client device identifiers 54 (e.g., device hardware addresses such as Media Access Control (MAC) addresses, device serial numbers, and/or other identifying information (uniquely) identifying client devices 20).

Each user record 50 may include user role information 56. As examples, role information 56 may provide labels (e.g., interpretable by access point 10) that indicate a role of the user (e.g., whether the particular user has administrator privileges, is an employee of a particular department, and/or one or more network portions the user is authorized to access, etc.), a role of one or more client devices 20 identified by identifiers 54 (e.g., a first device having a first configuration may be authorized to access a first network portion and not a second network portion, a second device having a second configuration may be authorized to access the first and second network portions, etc.), VLAN and other network segmentation information (e.g., VLAN(s) assigned to one or more client devices 20 identified by identifiers 54), and/or other contextual information usable to inform (e.g., the degree of) network access of client devices 20 identified by identifiers 54. If desired, information 56 may include time-to-expiry information (e.g., a time-to-expiry value) for key 52 indicating when key 52 is set to expire, may include conditions for revoking network access (e.g., if a software version of a connecting client device is not up-to-date), etc. If desired, each user record 50 may include any other suitable information to assist in the authentication of user identity, the authorization of client device network access, the providing of contextual information about the authorized network access, and/or the management of network access by server 32.

Any suitable number of entries or records 50 may be maintained on database 48. Server 32 (e.g., processing circuitry 34) may update user database 48 to reflect up-to-date information regarding device groups (e.g., maintained as records 50). As an illustrative example, a new user record 50 may be added into database 48 as a new user is onboarded. The addition of new user record 50 may entail the generation and storage of a unique key 52 for that new user record 50, the storage of client device identifier(s) 54, and/or the storage of user role information 56. As another illustrative example, a new client device 20 may be onboarded by server 32 and user database 48 may be updated to reflect the newly onboarded client device 20. In particular, the device identifier for the newly onboarded client device 20 may be added to identifiers 54 of an existing user record 50. In scenarios in which the new user and the new client device should both be onboarded by server 32, server 32 may first add a new user record 50 (e.g., generate a corresponding unique key for record 50) before including the identifier of the new client device in the newly added user record 50.

In some scenarios, user identity may be authenticated before the corresponding record 50 is added or updated. Server 32 may maintain, on a local database such as user authentication database 58 (e.g., an enterprise directory), user authentication information such as user credentials 60 (e.g., user login credentials, username, password, etc.).

If desired, server 32 may communicate with external equipment such as other supplement servers to authenticate user identity and/or to provide additional contextual information for the network, the users of the network, and/or the client devices connected to the network to facilitate the management of database 48 and/or database 58. As one illustrative example, server 32 may communicate with a user identity provider system (sometimes referred to as a single sign-on (SSO) provider platform) such as user authentication server 62 that provides user identity authentication. In the example of FIG. 4, server 32 may forward any user-input credential information over communication link 68 (e.g., provided by an application programing interface) to server 32 to authenticate users whose devices are requesting to connect to network 8. Server 62 may provide server 32 with a result of user authentication and other resulting information (e.g., information indicative of a successful user authentication, user role information 56 that may be stored as part of a record 50 in database 48, etc.).

Configurations in which server 32 and server 62 are implemented on server equipment (e.g., server equipment 30 in FIG. 1) on which network access management software and user authentication software are executed are sometimes referred to herein as an illustrative example. In this example, the server equipment implementing server 32 and server 62 may be implemented within the same cloud network as or on different cloud networks. If desired, one or more functions of server 32 and/or server 62 may be implemented locally on network devices 10 (e.g., on a controller device or access points) instead of as a cloud application (e.g., implemented on server equipment) or may be implemented in other desired manners.

Figure 5:
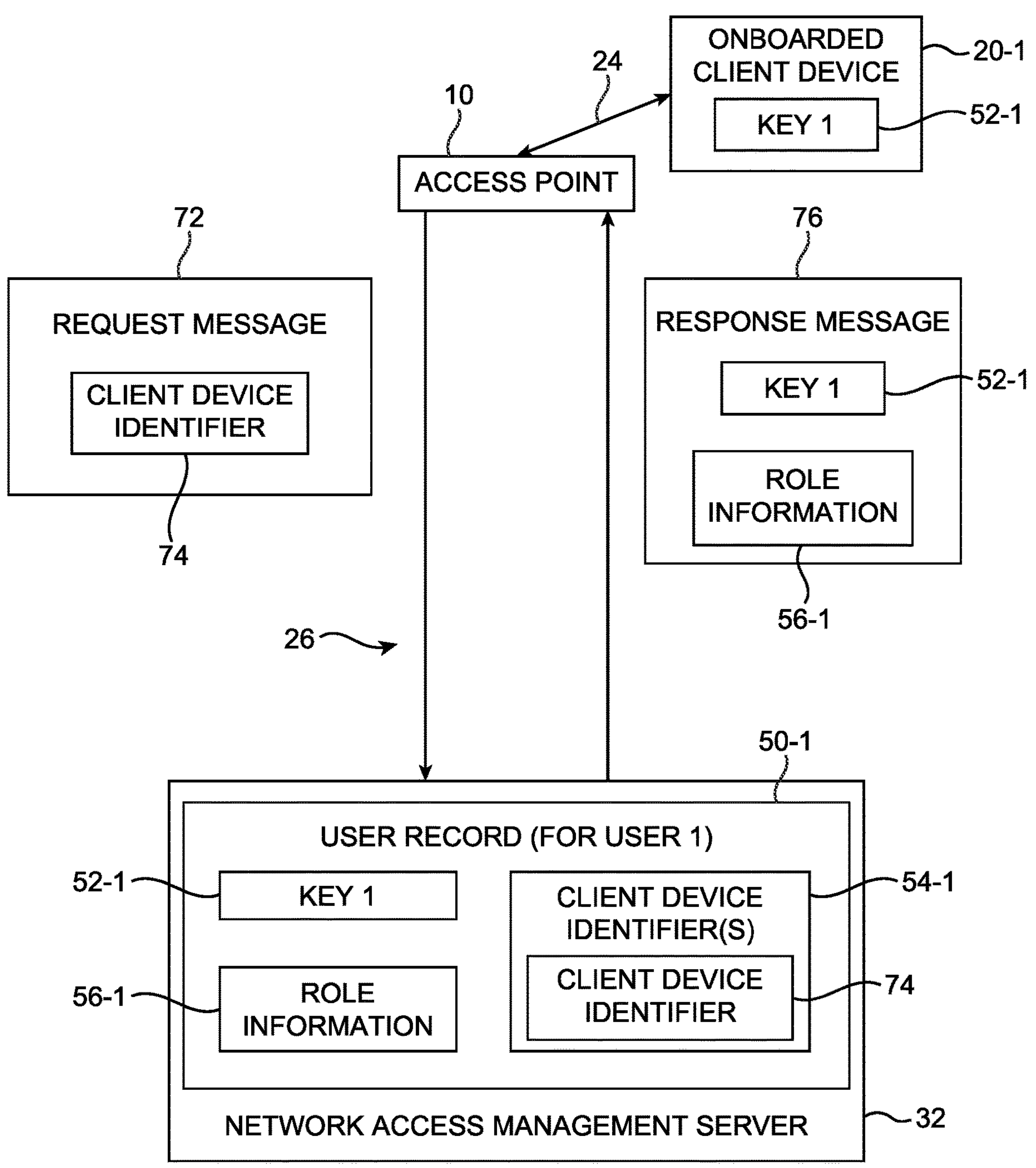
FIG. 5 is a diagram of illustrative messages exchanged and illustrative operations performed for authenticating an onboarded client device in accordance with some embodiments.

FIG. 5 shows how components of system 6 (FIG. 1) such as access point 10 and network access management server 32 may communicate with one another to authenticate network access for an already onboarded client device such as client device 20-1. In particular, the operations described in connection with FIG. 5 may be performed as part of block 42 in FIG. 3 to provide access point 10 with the user-specific key.

In the example of FIG. 5, onboarded client device 20-1 may be in communication with access point 10 to authenticate its network access to network 8 via access point 10. In one illustrative scenario, client device 20-1 and access point 10 may be in the process of completing a key exchange operation based on stored user-specific key 52-1 to obtain session keys (e.g., as part of WPA2). In another illustrative scenario, device 20-1 and access point 10 may be in the process of completing a key authentication process (e.g., based on a Simultaneous Authentication of Equals (SAE) protocol as part of WPA3).

As part of the message exchange between access point 10 and client device 20-1, access point 10 may receive a client device identifier 74 (e.g., a MAC address) for client device 20-1 in one or more frames sent by client device 20-1. To authenticate client device 20-1, access point 10 may send a request message 72 (e.g., a MAC authentication message in accordance with the RADIUS protocol) to server 32 containing client device identifier 74 obtained from the frame header of a frame received from client device 20-1.

Upon receiving request message 72, server 32 may compare client device identifier 74 to corresponding client device identifiers 54 stored in one or more records 50 in client device authentication database 48 (FIG. 3). In the example of FIG. 5, database 48 includes a particular record 50-1 for a user. Server 32 may match the client device identifier 74 received in request message 72 to the same client device identifier 74 stored as part of the list of device identifiers 54-1 indicative of a list of client devices 20-1 belonging to the user associated with record 50-1.

In response to request message 72 and in response to determining that a match for device identifier 74 exists in record 50-1, server 32 may send response message 76 (e.g., an access-accept packet in accordance with the RADIUS protocol) to access point 10. Response message 76 may include user-specific key 52-1 populated from the matching record 50-1 and role information 56-1 populated from the matching record 50-1. Role information 56-1 may include any suitable role information described in connection with information 56 in FIG. 4. Based on the information received in response message 76, access point 10 may authorize network access of client device 20-1 to network 8. As an example, access point 10 may use user key 52-1 to complete the key exchange operation with client device 20-1 (e.g., to obtain session keys), thereby authorizing and enabling client device 20-1 to connect to network 8. Access point 10 may also store the received role information 56-1 and configure the network access of client device 20-1 accordingly (e.g., allow access to only a portion of network 8 based on role information 56-1, associate the client device with a particular VLAN indicated in role information 56-1, etc.).

Configurations in which request message 72 and response message 76 are packets based on the RADIUS protocol are sometimes described herein as an illustrative example. If desired, other types of packets or messages (e.g., associated with other protocols) may be used to convey the information described herein with respect to request message 72 and response message 76.

Figure 6:
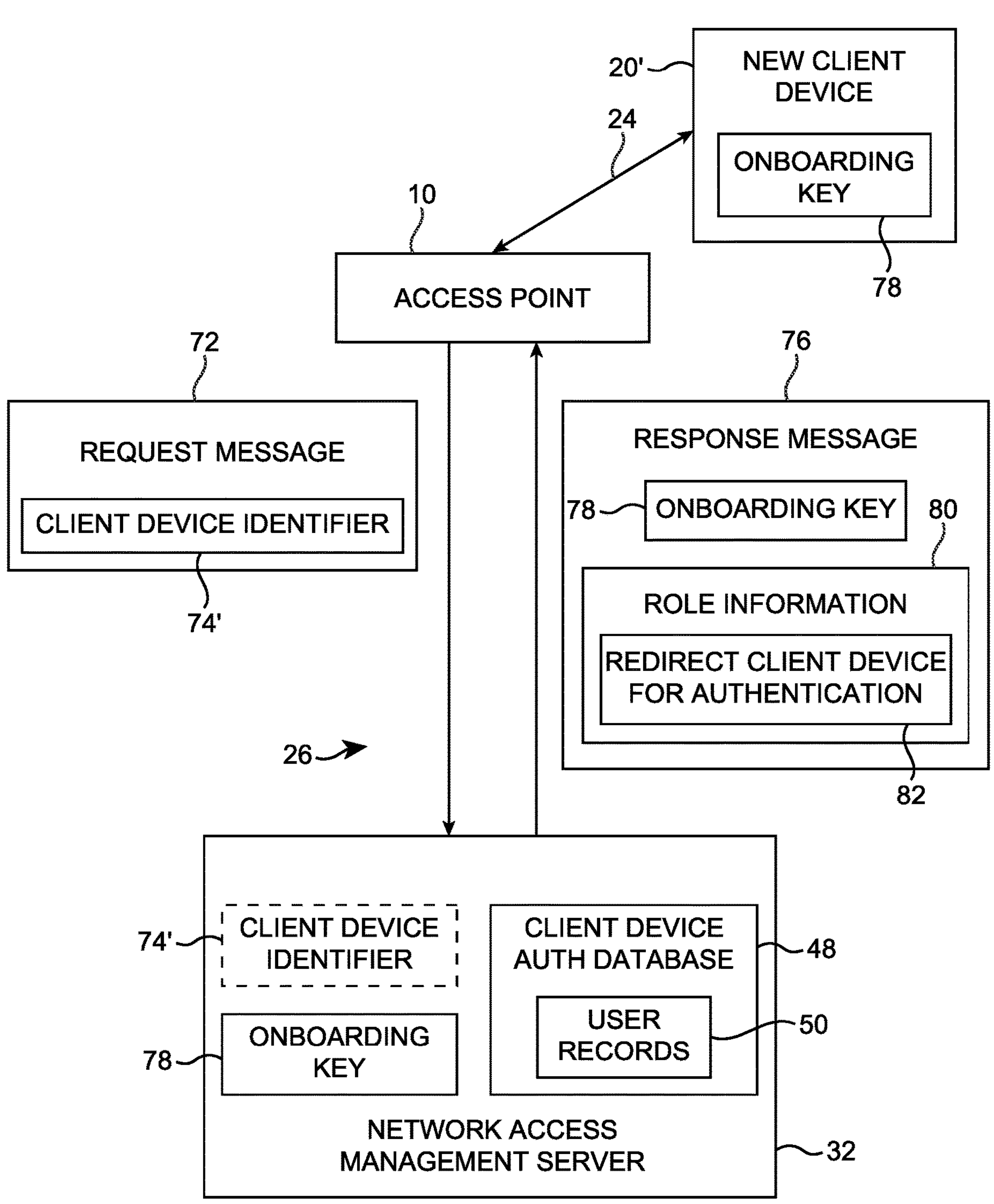
FIGS. 6 and 7 are diagrams of illustrative messages exchanged and illustrative operations performed for onboarding a new client device in accordance with some embodiments.
Figure 7:
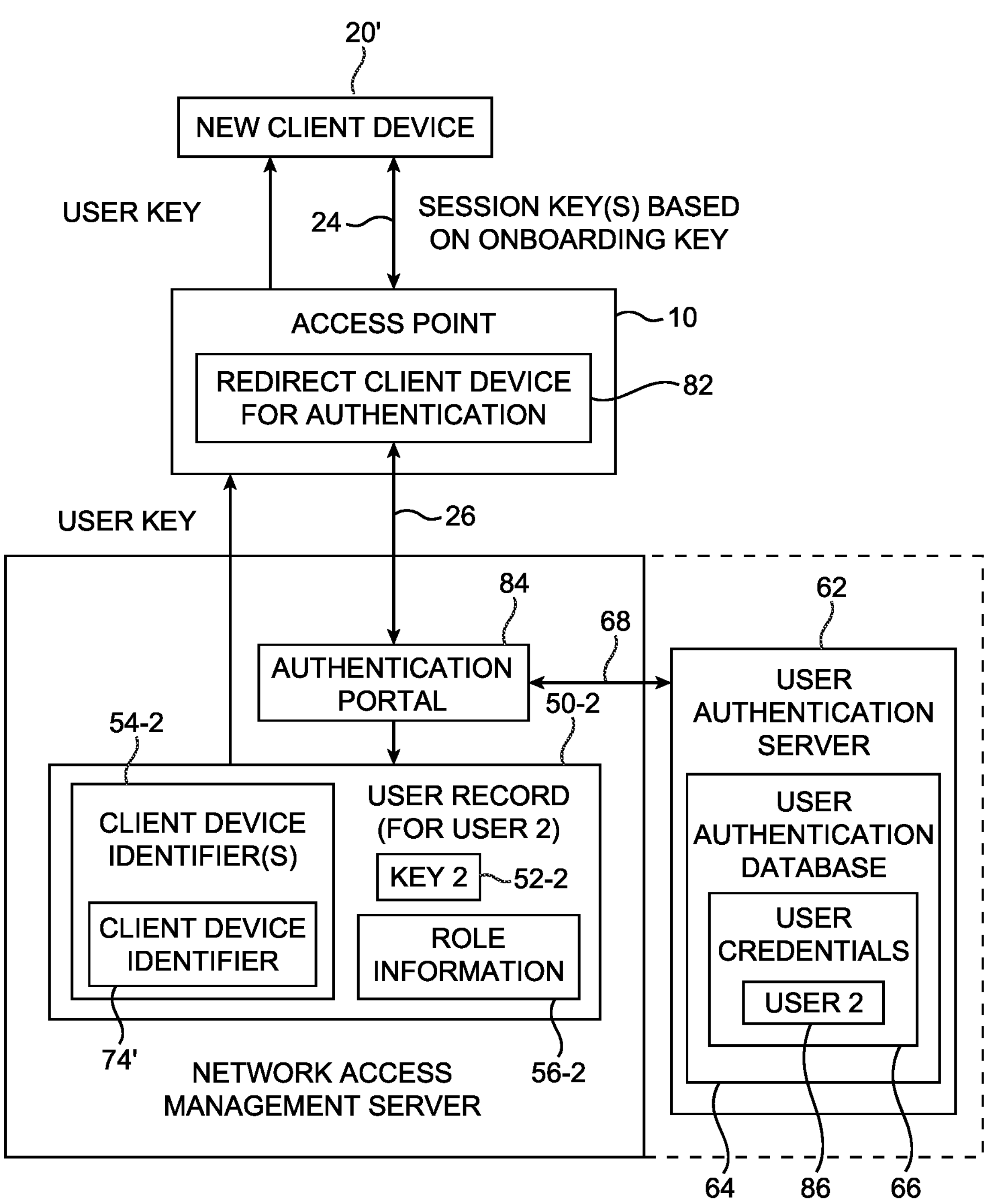

FIGS. 6 and 7 show how components of system 6 (FIG. 1) such as access point 10, network access management server 32, and user authentication server 62 may communicate with one another to onboard a new client device such as client device 20'. In particular, the operations described in connection with FIGS. 6 and 7 may be performed as part of block 40 in FIG. 3 to provide client device 20 with the user-specific key as part of the client device onboarding process.

As shown in FIG. 6, new client device 20' may connect to access point 10 via wireless communication link 24. Client device 20' may be new because database 48 (FIG. 4) of server 32 does not include a record of client device 20' (e.g., as part of any user record 50). The user of new client device 20' may be a new user (e.g., database 48 does not include a record 50 for the user, and more importantly, server 32 has not generated a user-specific key for the user) or may be an onboarded user (e.g., database 48 includes a record 50 for the user that includes a generated user-specific key for the user).

The initial wireless connection via link 24 may be established using an onboarding key 78 (e.g., a common pre-shared key (PSK) not unique to any user or device group). Onboarding key 78 (sometimes referred to as a common key) may be a key generally usable by any client device 20 (regardless of user identity) to connect to a particular service set identifier (SSID) of access point 10. While the use of onboarding key 78 can provide some network access, network access to network 8 may be less secure and/or be limited in nature. Configurations in which a network connection provided using onboarding key 78 is used (exclusively) to onboard the client device are sometimes described herein as an illustrative example.

FIG. 6 illustrates how new client device 20' may first use onboarding key 78 to obtain (limited) network access prior to being onboarded (as illustrated in FIG. 7).

Similarly to the operations described in connection with FIG. 5, in FIG. 6, client device 20' may be in communication with access point 10 (e.g., based on WPA2 or WPA3) to authenticate its network access to network 8 via access point 10 using onboarding key 78 (instead of a user-specific key). As part of the message exchange between access point 10 and client device 20', access point 10 may receive a client device identifier 74' (e.g., a MAC address) for client device 20' in one or more frames sent by client device 20'. To authenticate client device 20-1, access point 10 may send a request message 72 (e.g., a MAC authentication message in accordance with the RADIUS protocol) to server 32 containing client device identifier 74' obtained from the frame header of a frame received from client device 20'.

Upon receiving request message 72, server 32 may compare client device identifier 74' to corresponding client device identifiers 54 stored in one or more records 50 in client device authentication database 48. While in the example of FIG. 5 a particular matching record 50 is found because client device 20-1 has been onboarded, in the example of FIG. 6 no matching record 50 (containing client device identifier 74') is found in database 48.

Accordingly, in response to request message 72 and in response to determining that client device onboarding is needed (e.g., determining that client device identifier 74' is not present in database 48 which is indicative of client device 20' not having been onboarded), server 32 may send a response message 76 (e.g., an access-accept packet in accordance with the RADIUS protocol) to access point 10 that facilitates the onboarding of client device 20'. Response message 76 may include the onboarding key 78 (maintained on server 32 for this onboarding scenario) and role information 80 populated with redirect information such as an indication 82 to redirect client device for authentication.

Based on the information received in response message 76, access point 10 may authorize (limited) network access of client device 20-1. As an example, access point 10 may use onboarding key 78 to complete the key exchange operation with client device 20' (e.g., to obtain session keys based on onboarding key 78), thereby authorizing and enabling client device 20-1 to connect to network 8 in a limited manner (e.g., for the purposes of client device onboarding). In particular, access point 10 may store the received role information 80 such as indication 82 for redirecting client device 20' for authentication, thereby limiting the network access of client device 20-1.

FIG. 7 shows how new client device 20' may be onboarded using the network access provided using session keys based on onboarding key 78 (as described in connection with FIG. 6). Prior to updating database 48 to include client device 20' whether in an existing record 50 or in a newly generated record 50, server 32 may perform or otherwise facilitate the authentication of the identity of the user of client device 20' (e.g., facilitate the validation of user credentials to ensure that the user should be provided, through client device 20', network access to network 8).

As shown in FIG. 7, based on indication 82, when client device 20' attempts to access the network (e.g., a particular web address over the Internet) via access point 10, access point 10 may redirect client device 20' to a user authentication service. Configurations in which server 32 provides an authentication portal 84 through which a user authentication service (e.g., provided by user authentication server 62) can be accessed are sometimes described herein as an illustrative example. If desired, the user authentication service may be integrated as part of network access management server 32 such that access point 10 may redirect to a user authentication service implemented on server 32. If desired, user authentication may be performed using an authentication system to which client device 20' connects separately (e.g., separately from server 32) and the user authentication system may convey the resulting authentication information (e.g., information indicative of a successful user authentication, user role information, etc.) to server 32. In configurations where client device 20' separately connects to a user authentication system, indication 82 may include identifying information and/or location information for the authentication system (e.g., a Uniform Resource Locator (URL) or web address).

In the example of FIG. 7, when client device 20' is redirected to authentication portion 84 based on indication 82, device 20' may receive a prompt provided by user authentication server 62 via authentication portal 84 to enter user credential information (e.g., user login credentials, a username, a password, etc.) for the user attempting to access network 8 using client device 20'. Any user credential information entered at client device 20' may be received by user authentication server 62 via authentication portal 84 and communication link 68 (e.g., provided by an application programming interface or any other suitable communication channel). User authentication server 62 may match any entered user (login) credentials to user (login) credentials 66 in user authentication database 64. User authentication server 62 may provide information to server 32 indicative of a successful user authentication and any relevant user role information (e.g., for storage as role information 56 in a record 50 for the authenticated user). In other words, server 32 may receive any resulting user authentication information via authentication portal 84 and may use the received information as an indication to update database 48 to include client device 20'.

As an example, server 62 may match the entered user credentials to user credentials for user 86 and may provide an indication of user 86 to server 32 as well as any role information for user 86 to server 32. Based on this received information, server 32 may generate a new record 50-2 for user 86 (if user 86 has not yet been onboarded) or update an existing record 50-2 for user 86 (if user 86 has already been onboarded).

When generating a new record 50-2, server 32 may also generate and store a unique user-specific key 52-2 for new record 50-2, user-specific key 52-2 being usable by client device 20' and more generally by any other client device of the same user for authenticating network access. As part of generating a new record 50-2, server 32 may also store identifier 74' of client device 20' as part of the list of identifiers 54-2 of client devices of the same user. If desired, server 32 may also store any obtained role information 56-2 (e.g., role information 56 in FIG. 4) as part of new record 50-2.

When updating an existing record 50-2, server 32 may update the list of identifiers 54-2 of client devices to include identifier 74' of client device 20'. If server 32 obtains any new role information (e.g., from server 62), server 32 may also update role information 56-2 to include the newly obtained role information.

After generating or updating record 50-2, server 32 may convey user-specific key 52-2 (e.g., in an encrypted form) to client device 20' via access point 10. As an example, access point 10 may provide or forward network traffic representative of a webpage containing key 52-2 such that key 52-2 may be displayed on a webpage application on client device 20' (for a user). If desired, key 52-2 may be conveyed from server 32 to client device 20' in other manners (e.g., with or without forwarding of network traffic by access point 10).

After client device 20' obtains user-specific key 52-2, indication 82 may be removed from access point 10, client device onboarding may be completed, and client device 20' may be an onboarded client device. Thereafter, access point 10 and server 32 may further perform operations analogous to those described in connection with FIG. 5 to authenticate network access of client device 20', as an onboarded client device, using user-specific key 52-2. By obtaining the network access using user-specific key 52-2, client device 20' and access point 10 may obtain updated session keys based on user-specific key 52-2 instead of a common onboarding key. Client device 20' may send normal network traffic to and receive normal network traffic from network 8 via access point 10 (while using the updated session keys for encryption and decryption). Additionally, client device 20' may store user-specific key 52-2 for use in authenticating its network access for future wireless connections to network 8 (e.g., via the same access point 10 at a later time, via a different access point 10, etc.).

Figure 8:
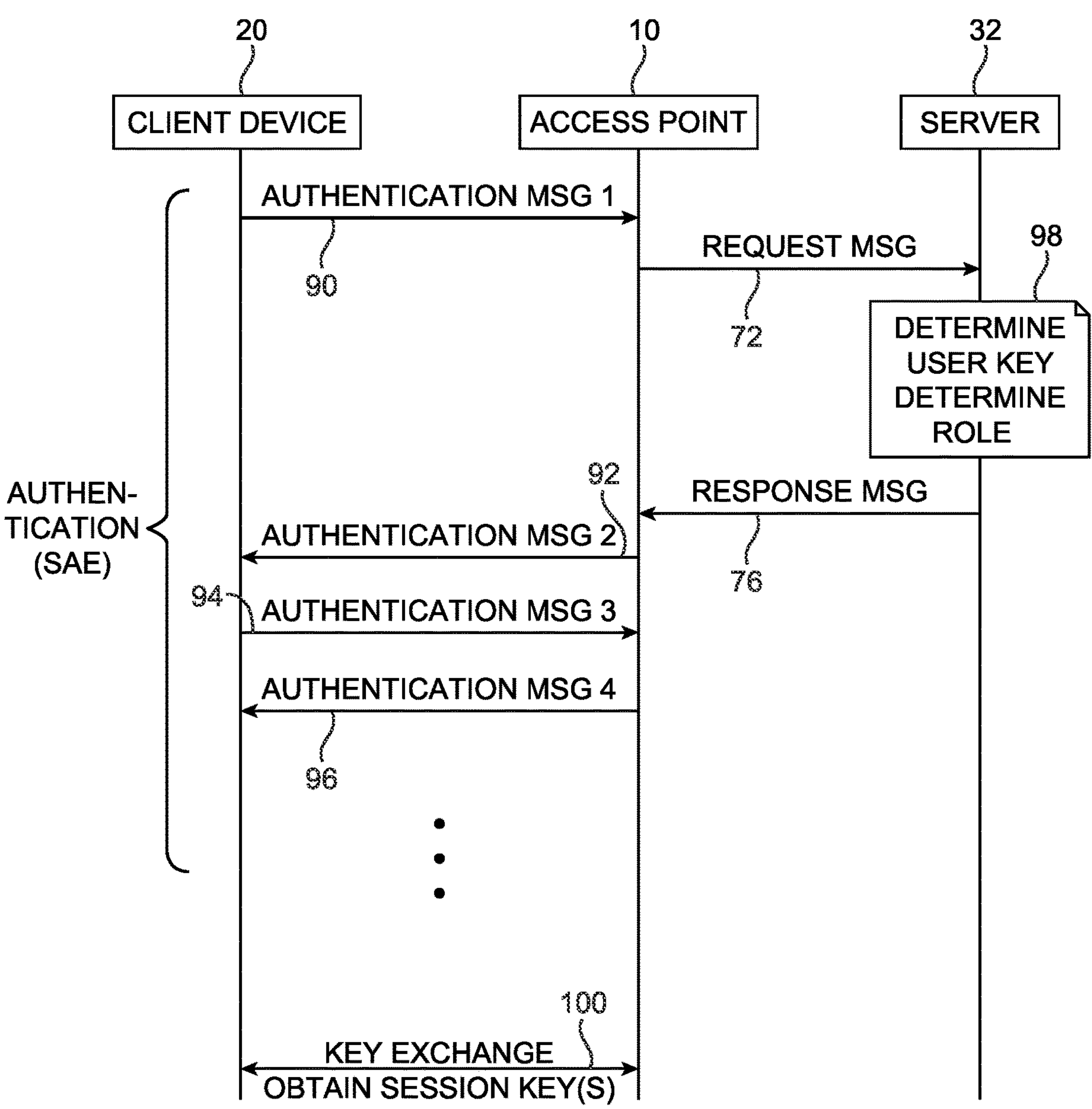
FIG. 8 is a flowchart of illustrative operations for performing an initial wireless network authentication based on a user-specific key in accordance with some embodiments.

An illustrative manner in which the exchange of request message 72 and response message 76 between access point 10 and server 32 as described in connection with FIGS. 5-7 may be performed in connection with message exchange between access point 10 and client device 20 is shown in the example of FIG. 8. In the example of FIG. 8, client device 20 and access point 10 may be configured to use Wi-Fi Protected Access 3 (WPA3) as the security protocol in connecting client device 20 to the wireless network portion of network 8 provided by access point 10.

As shown in FIG. 8, client device 20 and access point 10 may perform an exchange of four authentication messages based on the Simultaneous Authentication of Equals (SAE) protocol to each obtain the same pairwise master key (PMK). Configurations in which a user-specific key (e.g., a UPSK) is used, the PMK may be derived based on the user-specific key. Accordingly, access point 10 and/or client device 20 may obtain the user-specific key from server 32 as part of this exchange of authentication messages.

In particular, client device 20 may send a first authentication message 90 (e.g., an authentication-commit request message based on the SAE protocol) to access point 10. In order to obtain the user-specific key (and role information) based on which a second authentication message 92 (e.g., an authentication-commit response message based on the SAE protocol) is sent from access point 10 to client device 20, access point 10 may exchange messages with server 32.

As part of the message exchange between access point 10 and server 32, access point 10 may send request message 72 that includes an identifier of client device 20 requesting the user-specific key for client device 20 that can be used to derive session keys (e.g., a pairwise transient key (PTK)) and role information (e.g., role information 56). After determining the user-specific key and/or role information at block 98, server 32 may respond with a response message 76 that provides the requested information to access point 10. In some instances (e.g., where client device 20 has not been onboarded), server 32 may be unable to perform the operations of block 98 and may instead include an indication for redirecting client device 20 for authentication in response message 76. The exchange of messages 72 and 76 and the operations of obtaining the user-specific key at block 98 (including the redirection and onboarding of client device 20) may be performed in the same manner as described in connection with FIGS. 5-7.

After access point 10 has received the user-specific key and the role information (if any), access point 10 may continue the message exchange by sending the second authentication message 92 (e.g., an authentication-commit response message based on the SAE protocol) to client device 20. Client device 20 and access point 10 may further exchange third and fourth authentication messages 94 and 96 (e.g., authentication-confirm request and response messages based on the SAE protocol). This may conclude the SAE-based authentication operation and client device 20 and access point 10 may both be in possession of the PMK.

At a later time, client device 20 and access point 10 may further exchange messages 100 to perform a key exchange operation (e.g., using Extensible Authentication Protocol (EAP) over LAN (EAPOL)) and obtain session keys such as the PTK derived from the PMK (e.g., the PMK being derived from the user-specific key), and a groupwise transient key (GTK) not derived from the PMK. The exchange of messages 100 may be formed as part of block 44 in FIG. 3. The PTK may be used to encrypt and decrypt unicast network traffic between client device 20 and access point 10, while the GTK may be used to encrypt and decrypt broadcast network traffic between client device 20 and access point 10 (e.g., as described in connection with block 46 in FIG. 3).

Figure 9:
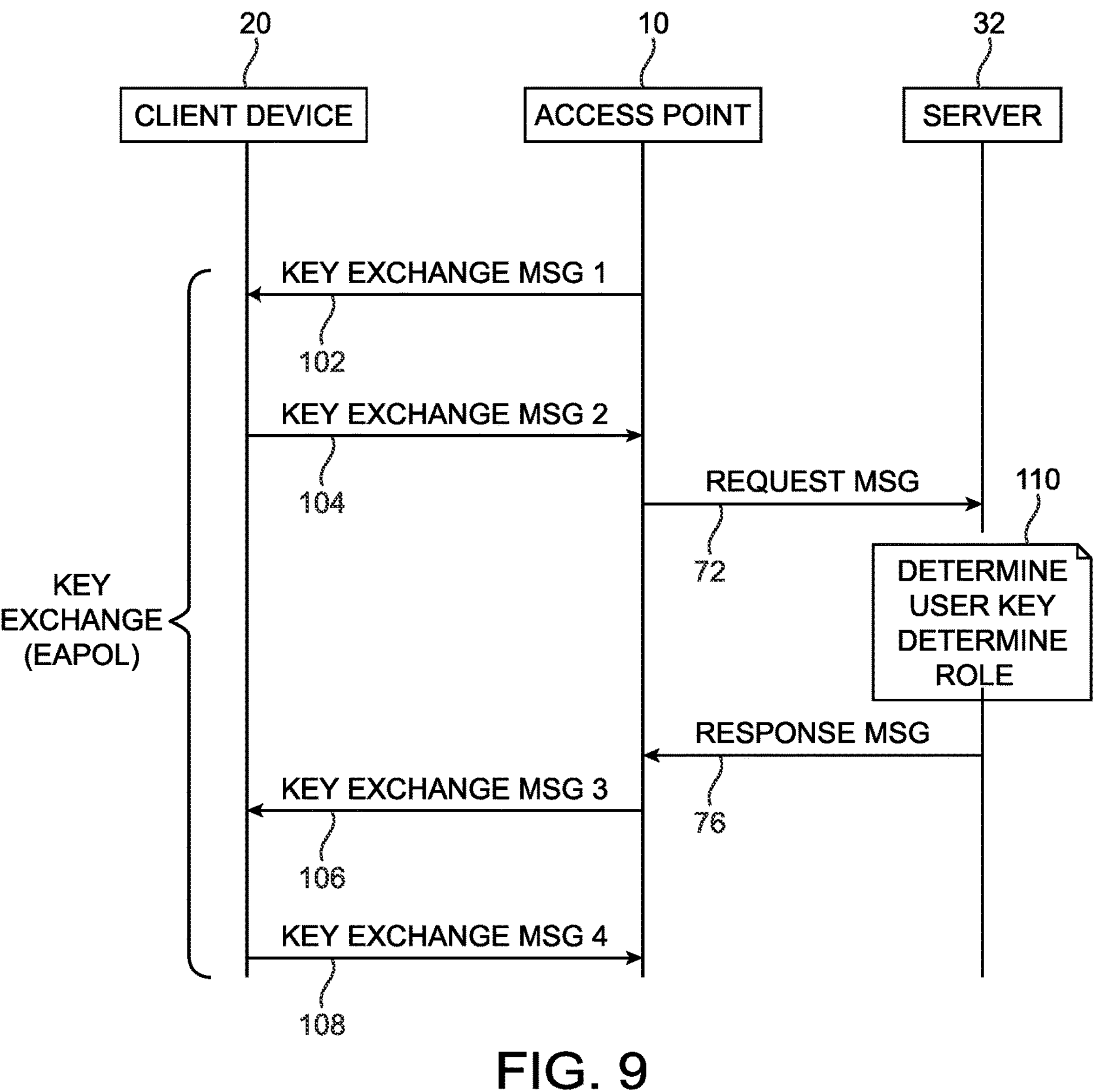
FIG. 9 is a flowchart of illustrative operations for performing a key exchange operation based on a user-specific key in accordance with some embodiments.

Another illustrative manner in which the exchange of request message 72 and response message 76 between access point 10 and server 32 as described in connection with FIGS. 5-7 may be performed in connection with message exchange between access point 10 and client device 20 is shown in the example of FIG. 9. In the example of FIG. 9, client device 20 and access point 10 may be configured to use Wi-Fi Protected Access 2 (WPA2) as the security protocol in connecting client device 20 to the wireless network portion of network 8 provided by access point 10.

As shown in FIG. 9, client device 20 may perform a key exchange operation using a four-way handshake (e.g., the exchange of four authentication messages or frames based on EAP or more specifically based on EAPOL) to obtain session keys.

In particular, access point 10 may send a first key exchange message 102 (e.g., message 1 of EAPOL-key messages) to client device 20. Message 102 may include a random value (sometimes referred to as ANonce) generated by access point 10. Client device 20 (e.g., when onboarded) may store the user-specific key (e.g., a UPSK) and may use the user-specific key to derive the PMK. Once client device 20 receives the ANonce, client device 20 can use the PMK, the ANonce, an SNonce (a random value generated by client device 20), and the MAC addresses of client device 20 and access point 10 to derive the PTK.

Client device 20 may respond by sending a second key exchange message 104 (e.g., message 2 of EAPOL-key messages) to access point 10. Message 104 may include the SNonce and a cryptographic checksum (e.g., a message integrity check (MIC) value) generated by client device 20 based on the PTK.

After receiving message 104, access point 10 should generate the PTK and validate the cryptographic checksum using the PTK before sending the GTK to client device 20. In order to derive the PTK and validate the cryptographic checksum, access point 10 will require the user-specific key (e.g., the UPSK) used by client device 20. Accordingly, access point 10 may exchange messages with server 32 to obtain the user-specific passcode (e.g., the UPSK) and user role information (if any) in order to derive the PTK and validate the cryptographic checksum.

As part of the message exchange between access point 10 and server 32, access point 10 may send a request message 72 requesting the user-specific key usable to complete the key exchange operation with client device 20 and any user role information. After determining the user-specific key and/or role information at block 110, server 32 may respond with a response message 76 that provides the requested information to access point 10. The exchange of messages 72 and 76 and the operations of obtaining the user-specific key at block 110 (including the redirection and onboarding of client device 20) may be performed in the same manner as described in connection with FIGS. 5-7.

In some instances (e.g., where client device 20 has not been onboarded but the user of client device 20 has been onboarded), server 32 may be unable to perform the operations of block 110 as described in connection with FIG. 9. While in these instances server 32 may instead include an indication for redirecting client device 20 for authentication in response message 76 (in a similar manner to that described in connection with FIGS. 6 and 7), in the example of FIG. 9 server 32 may instead retrieve the desired user-specific key without necessarily performing the operations of FIGS. 6 and 7 (even though client device 20 may not have been onboarded). The specifics of this key retrieval process are further detailed below in connection with FIG. 10.

Still referring to FIG. 9, after access point 10 has received the user-specific key (and any user role information), access point 10 may derive the PTK (based on the received user-specific key) and validate the cryptographic checksum (using the derived PTK).

Thereafter, access point 10 may continue the key exchange operation by sending a third key exchange message 106 (e.g., message 3 of EAPOL-key messages) to client device 20. Message 106 may include the GTK (e.g., an PTK-encrypted version of the GTK). Client device 20 may respond by sending a fourth key exchange message 108 (e.g., message 4 of EAPOL-key messages) to access point 10 to confirm the reception and/or derivation of session keys and conclude the key exchange operation. Normal network traffic (encrypted using the PTK and GTK) may be conveyed between client device 20 and access point 10 after the conclusion of the key exchange operation.

FIGS. 8 and 9 are merely illustrative of some of the message exchanges taking place between client device 20, access point 10, and server 32. In general, other messages may be exchanged within the system as part of the process of obtaining a functional wireless network connection between client device 20 and access point 10. As just a few examples, client device 20 and access point 10 may additionally exchange probe request and response messages and association request and response message, may exchange other types of authentication messages (e.g., in the WPA2 scheme in FIG. 9), etc.

As described in connection with FIG. 9, when client device 20 in FIG. 9 is a new client device that has not been onboarded but the user of the client has been onboarded (e.g., a record 50 exists for the user but the device identifier (s) 54 of the record does not include client 20), server 32 may be configured to determine, as part of operation 110, the user-specific key by using a scheme similar to a dictionary attack.

Figure 10:
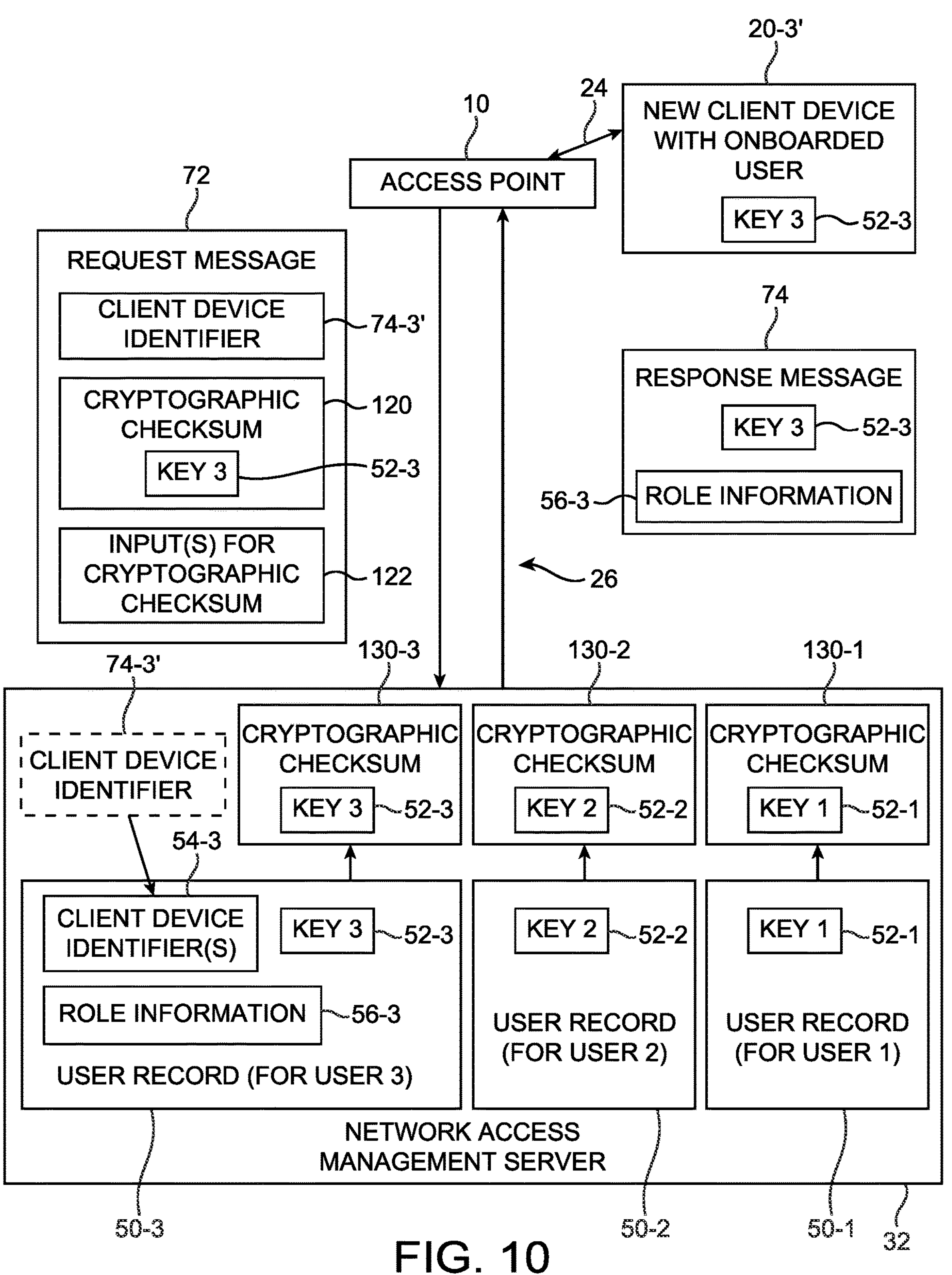
FIG. 10 is a diagram of illustrative messages exchanged and illustrative operations performed for onboarding a new client device of an onboarded user in accordance with some embodiments.

FIG. 10 is a diagram of illustrative operations for determining a user-specific key (e.g., performed by server 32 as part of operation 110 of FIG. 9) using a dictionary-attack-style key cracking mechanism. As shown in FIG. 10, a new client device 20-3' with a previously onboarded user (USER 3 in the example of FIG. 10) may exchange messages such as messages 102 and 104 in FIG. 9 with access point 10 using key 52-3 (more specifically using the PMK derived from key 52-3 as described in connection with FIG. 9). Server 32 may include a user record 50-3 for the already-onboarded user but the record may not include any indication of new client device 20-3' (e.g., because the user has not used new client device 20-3' to connect to network 8 previously). As such, server 32 may be unable to directly perform the lookup operation using the identifier of client device 20-3' to obtain key 52-3 in the manner as described in connection to FIG. 5.

To obtain the user-specific key from which the PMK is derived and based on which the MIC value is validated thereafter, access point 10 may send an request message 72 containing client device identifier 74-3' (e.g., a MAC address) of client device 20-3', a cryptographic checksum 120 such as the MIC value (e.g., generated by client device 20-3' using user-specific key 52-3 and to be validated using user-specific key 52-3), and inputs 122 for generating the cryptographic checksum such as the MAC address of access point 10, the ANonce, and/or any other data based on which the MIC value the cryptographic checksum is computed. Configurations in which the request message 72 is an MAC authentication frame with a vendor-specific attribute (VSA) containing identifier 74-3', checksum 120, and inputs 122 are sometimes described herein as an illustrative example. If desired, request message 72 may be other types of message having other types of structures (attributes) for conveying identifier 74-3', checksum 120, and inputs 122.

Upon receiving request message 72, server 32 may attempt to perform a lookup operation based on identifier 74-3' to identify any matching records 50 containing identifier 74-3' but may fail to find any matching record 50 because client device 20-3 has not been onboarded. However, because the user of client device 20-3' has been onboarded, the requested user-specific key 52-3 may in fact be present in a given record 50.

Because access request message 72 does not directly provide user-specific key 52-3 but rather includes cryptographic checksum 120 indirectly generated using user-specific key 52-3 and includes inputs 122 used to generate cryptographic checksum 120, server 32 may employ a dictionary attack mechanism to determine which of the stored user-specific keys in records 50 match the user-specific key directly used by client device 20-3' to generate cryptographic checksum 120.

As shown in FIG. 10, server 32 may generate a cryptographic checksum 130 for each user record 50 using the user-specific key 52 of that user record 50 and using inputs 122 provided in message 72. In the example of FIG. 10, server 32 may generate a first cryptographic checksum 130-1 using user-specific key 52-1 (and inputs 122 over which checksum 130-1 is computed), a second cryptographic checksum 130-2 using user-specific key 52-2 (and inputs 122 over which checksum 130-2 is computed), and a third cryptographic checksum 130-3 using user-specific key 52-2 (and inputs 122 over which checksum 130-3 is computed).

Server 32 may compare one or more generated checksums 130 to cryptographic checksum 120 received in message 120 to determine a match between generated checksums 130 and the received checksum 120. A match may be indicative of the matching user record (e.g., user record 50-3) containing the user-specific key (e.g., key 52-3) that is the same as the user-specific key used by client device 20-3' to generate checksum 120.

Server 32 may thereby determine that client device 20-3' belongs to the user associated with matching user record 50-3. Accordingly, server 32 may add client device identifier 74-3' (e.g., the MAC address) of client device 20-3' to client device identifiers 54-3 maintained in user record 50-3 (e.g., thereby indicating that client device 20-3' is associated with the user for which record 50-3 is stored). With the storage of identifier 74-3' in record 50-3, client device 20-3' may be considered onboarded.

After determining the matching record 50-3 and consequently the corresponding user-specific key 52-3, server 32 may send a response message 74 containing user-specific key 52-3 and any role information 56-3 (e.g., populated using role information 56-3 maintained in record 50-3). Upon receiving response message 76, access point 10 may continue the key exchange operation as described in connection with FIG. 9 (e.g., obtain session keys).

While the user-specific key derivation scheme of FIG. 10 is described in connection with the operations of FIG. 9, this is merely illustrative. If desired, the user-specific key derivation scheme of FIG. 10 may be used separately from the operations of FIG. 9. However, in some instances (e.g., when using a WPA3 protocol with SAE authentication), the user-specific key derivation scheme of FIG. 10 may not be possible.

Illustrative examples of the using user-specific keys are described in connection with FIGS. 1-10. However, these examples are merely illustrative. If desired, unique keys or passcodes (e.g., UPSKs) may generally be assigned to any suitable groups of client devices as desired. Accordingly, a group of client devices that share the same unique key may generally be referred to as a unique key group (or simply, a key group). Similarly, a unique key (e.g., a UPSK) may generally be referred to as a group-specific key (with a user-specific key being an example of a type of group-specific key).

Figure 11:
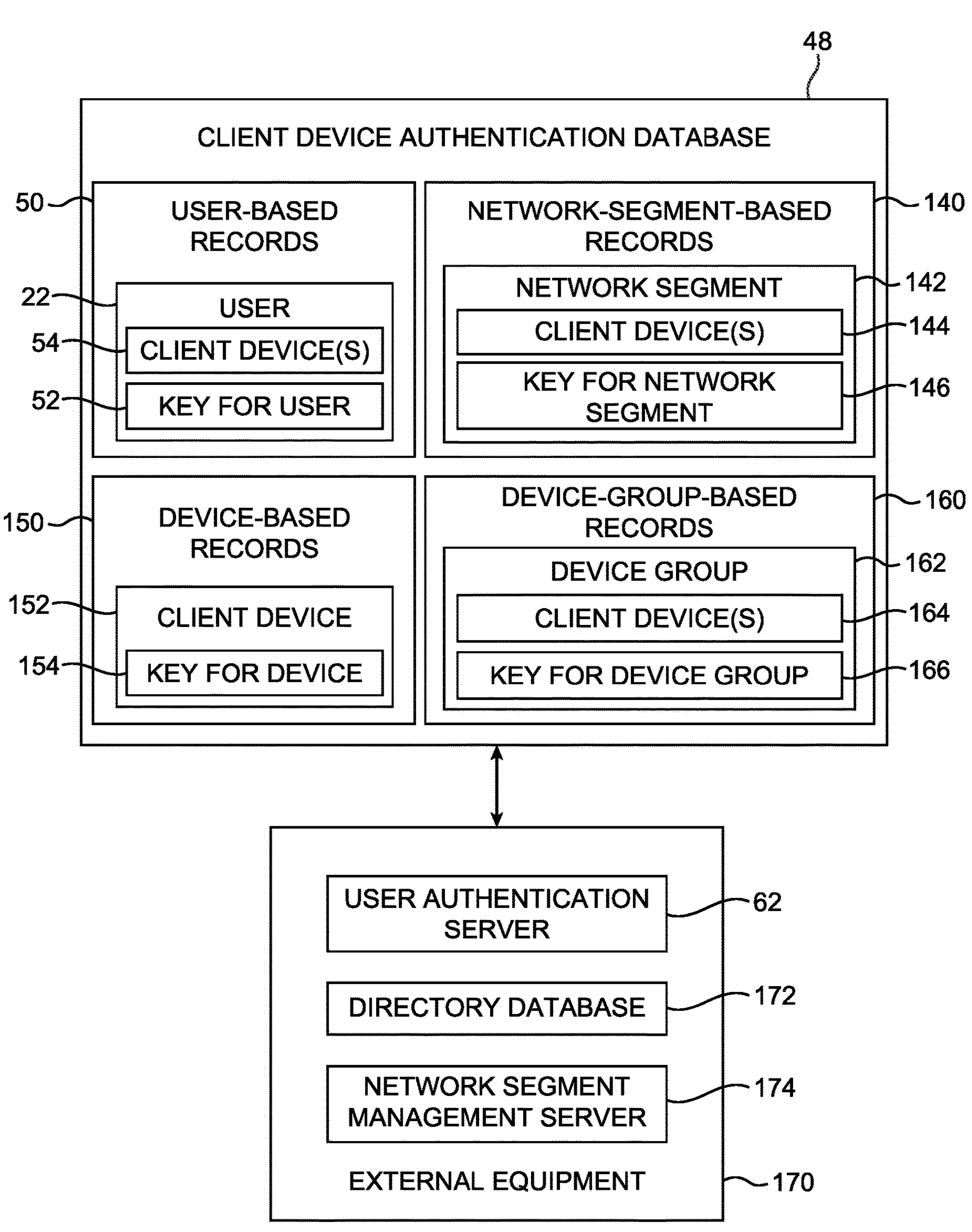
FIG. 11 is a diagram of illustrative types of key group records accessible to a network access management server for authenticating client devices in accordance with some embodiments.

FIG. 11 is a diagram of illustrative types of (unique) key groups and corresponding records that may be generated and managed by network access management server 32 in database 48. As shown in the example of FIG. 11, client device authentication database 48 may maintain one or more records 50 each for a user-based key group (as illustrated in FIGS. 1-10), may maintain one or more records 140 each for a network-segment-based key group, may maintain one or more records 150 each for a device-based key group, and/or may maintain one or more records 160 each for an administrator-customizable device-group-based key group.

Each user-based record 50 (sometimes referred to herein as user record 50) may be associated with a given user 22. Accordingly, each record 50 may include a group of client device(s) 54 (e.g., their MAC addresses) associated with the same user and a key 52 associated with that user (sometimes referred to as a user-specific key or user-based key). The user-specific key 52 may be unique to a given user 22 and may be assigned to and shared by the group of client device(s) 54 of the given user 22 for authenticating network access.

Each network-segment-based record 140 may be associated with a given network segment 142 within network 8. Accordingly, each record 140 may include a group of client device(s) 144 (e.g., their MAC addresses or other identifiers) associated with the same network segment and a key 146 associated with that network segment (sometimes referred to as a network-segment-specific key or network-segment-based key). The network-segment-specific key 146 may be unique to a given network segment 142 and may be assigned to and shared by the group of client device(s) 144 of the given network segment 142 for authenticating network access.

If desired, a client device key group that is assigned a group-specific key may include only a single client device that uses the group-specific key (sometimes referred to as a device-specific key in this example). Accordingly, each device-based record 150 may be associated with a single client device 152. Each record 150 may include only the single client device 152 (e.g., its MAC address or other identifier) and a key 154 associated with the single client device 152 (sometimes referred to as a device-specific key or device-based key). The device-specific key 154 may be unique to a given device 152 and may be assigned to and usable by only client device 152 for authenticating network access.

In general, the organization of key groups may be customizable in nature (e.g., configured as desired by a network administrator to assist in providing the desired network access architecture). A custom client device key group that is assigned a group-specific key may include any set of client devices based on any suitable criteria. Generally, a key group may simply be a device group (a group of client device(s)) that share a group-specific key unique to the device group. The group of client devices being associated with the same user, the same network segment, or containing only a single client device are illustrative examples.

Accordingly, each device-group-based record 160 may be associated with a device group 162 containing any set of client device(s) 164 (e.g., their MAC address or other identifiers). Each record 160 may generally include a group of client device(s) 164 (e.g., their MAC addresses or other identifiers) and a key 166 associated with the device group (sometimes referred to as a group-specific key or group-based key). The group-specific key 166 may be unique to a given device group 162 and may be assigned to and shared by the group of client device(s) 164 of the given device group 162 for authenticating network access.

To help support the management of different types of key groups (e.g., user-based key groups, network-segment-based key groups, device-based key groups, etc.), server 32 may communicate with external equipment 170 to generate and update records 50, 140, 150, and/or 160. As examples, external equipment 170 may include user authentication server 62 and/or a directory database 172 that facilitate the authentication of the identities of users 22, may include network segment management server 174 that provide information for network segments 142, etc.

Figure 12:
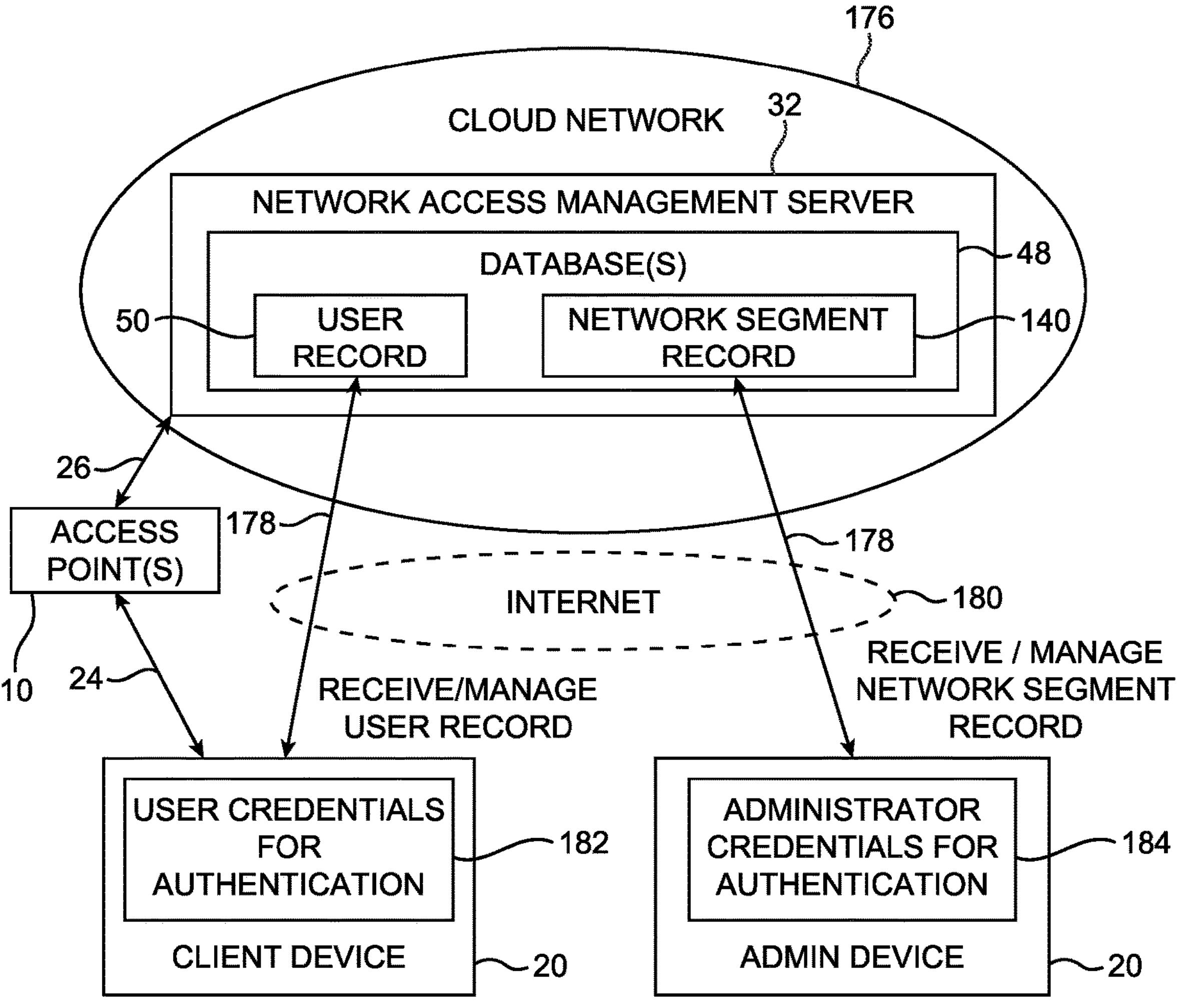
FIG. 12 is a diagram of an illustrative cloud-based network access management server coupled to access points and client devices in accordance with some embodiments.

FIG. 12 is a diagram of an illustrative network access management server accessible by various types of client devices to facilitate management of unique key groups by external devices. In the example of FIG. 12, Server 32 may be implemented as a part of a cloud network such as cloud network 176. Cloud network 176 may include one or more network devices such as switches (e.g., multi-layer switches), routers, gateways, bridges, hubs, repeaters, firewalls, wireless access points, devices serving other networking functions, devices that includes a combination of these functions, or other types of network devices. Multiple such network devices (e.g., of different types or having different functions) may be present in cloud network 176 and interconnected therebetween and with other network devices to form a cloud network that forwards traffic to and from portions of server 32 (e.g., compute, storage, and/or management devices of server equipment 30) serving as end hosts of cloud network 176.

Configurations in which server 32 is implemented on public cloud infrastructure (e.g., cloud network 176 is a public cloud network) are sometimes described herein as an illustrative example. If desired, server 32 may be implemented on a private cloud network or an on-prem network.

As shown in FIG. 12, a given client device 20 associated with (e.g., belonging to) a user may access the user's user record 50 in database 48 via communication link 178 by providing user (login) credentials 182 to authenticate user identity. After user credentials 182 have been validated (e.g., by server 32 and/or user authentication server 62), client device 20 may use communication link 178 to retrieve information regarding user record 50 such as his or her user-specific key in record 50, onboarded client devices in record 50, and/or other suitable information contained within user record 50. Client device 20, after authentication, may also manage (e.g., update) his or her record 50 by, e.g., generating record 50, generating or re-generating the user-specific key in record 50, adding and/or removing client devices in record 50, etc. As an example, client device 20 may retrieve information about record 50, update record 50 to include one or more client devices 20, and/or obtain the user-specific key in record 50 prior connecting to access point 10 (or prior to another client device 20 of the user connecting to access point 10) to ensure that the connecting client device is an onboarded client device and consequently network access authentication will proceed via the operations described in connection with FIG. 5.

As further shown in FIG. 12, another client device 20 such as an administrator device may access one or more records in database 48 such as network segment record 140 (FIG. 11) via communication link 178 by providing administrator (login) credentials 184 to authenticate administrator identity. After administrator credentials 184 have been validated (e.g., by server 32 and/or user authentication server 62), administrator client device 20 may use communication link 178 to retrieve and/or manage (e.g., update) information in any suitable record in database 48 (e.g., user record 50, network segment record 140, etc.) and may create and/or delete records in database 48, if authorized. As examples, administrator client device 20 may retrieve and/or update onboarded client devices in records, may retrieve and/or update group-specific keys in records, may retrieve and/or update role information in records, etc.

In general, user credentials 182 may have fewer privileges than administrator credentials 184. Accordingly, as described in the example of FIG. 12, user client device 20 may only be authorized to retrieve and/or update the user's own record 50, whereas administrator client device 20 may be authorized to retrieve and/or update any user records 50, network-policy-based records, and/or generally other types of records in database 48.

Configurations in which communication links 178 are implemented over the Internet 180 are sometimes described herein as an illustrative example. Communication link 178 may be established using communication path 24, access point 10, and communication path 26 or may be established using a communication path separate from communication path 24, access point 10, and/or communication path 26.

Figure 13:
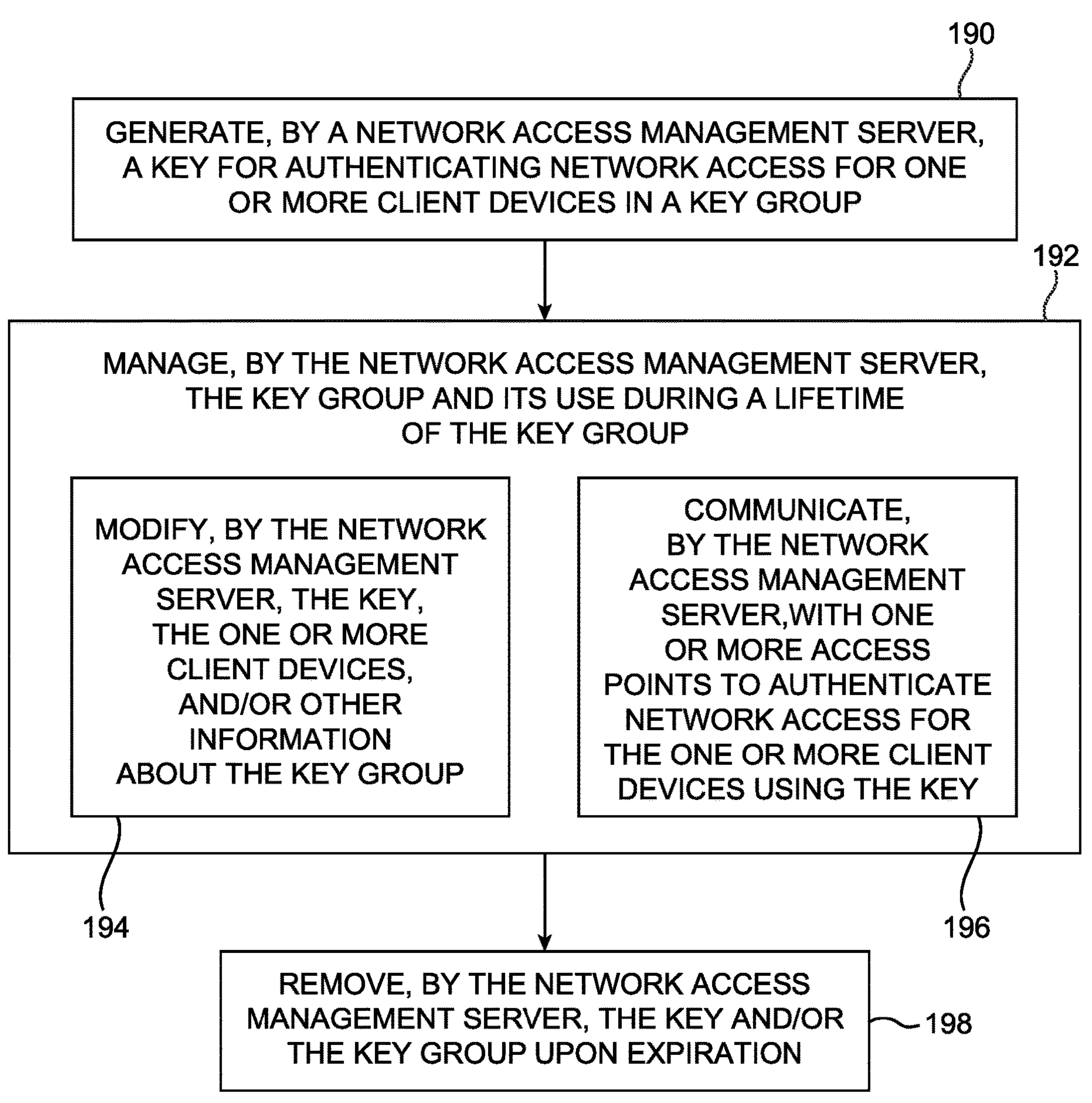
FIG. 13 is a flowchart of illustrative operations for managing a key group in accordance with some embodiments.

FIG. 13 is a flowchart of illustrative operations for managing key groups maintained as records in database 48 (FIGS. 11 and 12). These operations may be performed using network access management server 32, and/or other elements of networking system 6 in FIG. 1.

In configurations described herein as an illustrative example, the operations described in connection with FIG. 13 may be performed by control circuitry in server 32 (e.g., performed by processing circuitry 34 for server 32 by executing software instructions stored on memory circuitry 36). If desired, one or more operations described in connection with FIG. 3 may be performed by other dedicated hardware components in server 32. In other illustrative configurations (e.g., where access point 10 stores a local cache of key group information), at least some of these operations may be performed by control circuitry in access point 10 (e.g., performed by processing circuitry 12 in access point 10 by executing software instructions stored on memory circuitry 14).

At block 190, network access management server 32 may generate a key for authenticating network access for one or more client devices in a key group. Server 32 may generate the key when a user is onboarded or generally when a key group is created (e.g., by an administrator). Server 32 may maintain the generated key, the one or more client devices, and any other information about the key group (e.g., user role information) in a corresponding record in database 48 as described in connection with FIGS. 4 and 11.

At block 192, server 32 may manage the key group and the use of the key group during a lifetime of the key group. In particular, server 32 may maintain an up-to-date record of the key group in database 48 (FIGS. 4 and 11) and may access the contents of the records (e.g., as described in connection with FIGS. 5-10) as needed to facilitate the authentication of client devices for network access.

As an example of key group management, server 32 may, at block 194, update the (group-specific) key, the one or more client devices in the key group, and/or other information in the key group, or more specifically update the record in database 48 for the key group (see, e.g., FIGS. 6, 7, and 10). As an example of key group use, server 32 may, at block 196, communicate with one or more access points 10 to authenticate network access for one or more client devices in the key group using the key (see, e.g., FIGS. 5 and 8-10).

At block 198, server 32 may remove the key and/or the key group upon the expiration of the key group. As one illustrative example, server 32 may remove a user-based key group (and user-specific key) when the user should no longer be given network access (e.g., an employee is no longer with the employer). As another example, to ensure secure network access and prevent the accumulation of stale (out-of-date) records, all generated key groups may have a (pre-determined) finite lifetime (e.g., a finite time-to-expiry value). Server 32 may remove a corresponding record from database 48 to remove the key group and/or key.

Figure 14:
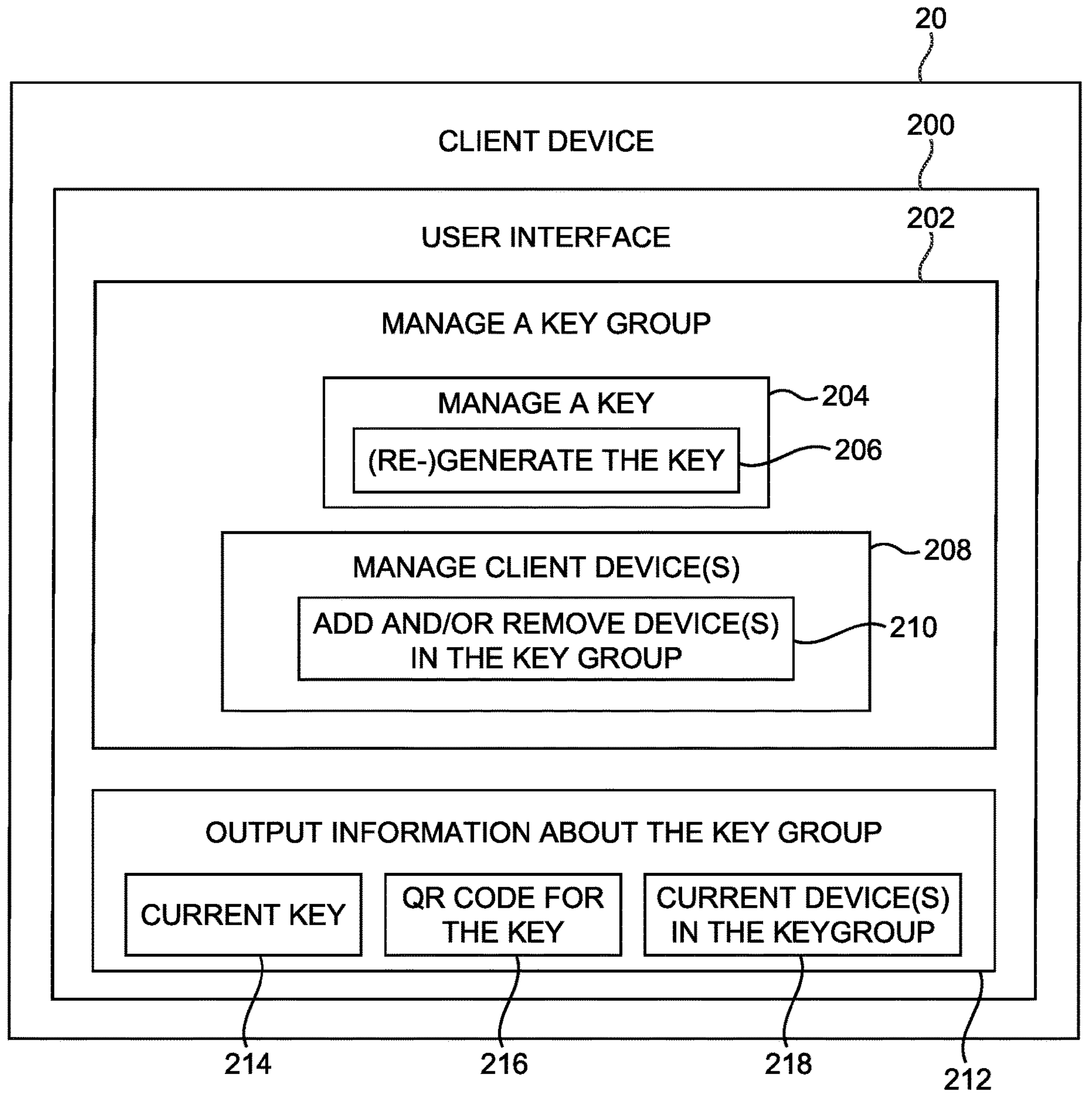
FIG. 14 is a diagram of an illustrative user interface provided at a client device through which user input is received and through which user output is supplied in accordance with some embodiments.

FIG. 14 is a diagram of an illustrative user interface provided at a client device 20 such as at user client device 20 or administrator client device 20 (FIG. 12). Client device 20 may include one or more input-output components such as a display (e.g., a touch-screen display), a keyboard, a mouse or touchpad, and/or other components configured to receive user input and/or provide output for the user. Configurations in which client device 20 includes a display based on which user interface 200 is at least partly implemented are described herein as an illustrative example.

As shown in the example of FIG. 14, server 32 may provide user-selectable options 202 for managing a key group using user interface 200 and/or may provide key group information 212 for output to the user (e.g., user-viewable information) using user interface 200.

As just a few illustrative examples of key group management options 202, server 32 may provide one or more options 204 to manage a group-specific key such as a selectable option 206 to generate and/or re-generate the key of the key group, server 32 may provide one or more options 208 to manage client device(s) of the key group such as options 210 to add client devices to and/or remove client devices from the key group, etc.

As just a few illustrative examples of key group information output to the user, server 32 may output a currently (group-specific) key 214 for the group, an alternative representation of the key such as a quick-response (QR) code 216 for the key, and current (e.g., currently onboarded) client devices 218 in the key group.

Figure 15:
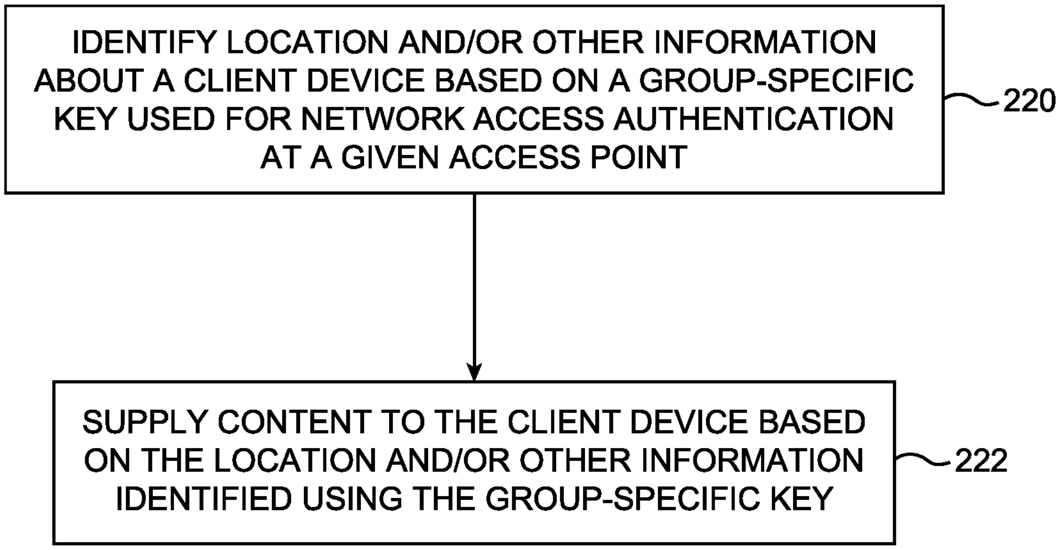
FIG. 15 is a flowchart of illustrative operations for supplying content based on information identified using a group-specific key in accordance with some embodiments.

FIG. 15 is a flowchart of illustrative operations for supplying content based on group-specific keys. These operations may be performed using access point 10 in FIGS. 1 and 2 and/or server 32 in FIG. 1, and/or other elements of networking system 6 in FIG. 1.

In configurations described herein as an illustrative example, the operations described in connection with FIG. 15 may be performed by control circuitry in access point 10 (e.g., performed by processing circuitry 12 in access point 10 by executing software instructions stored on memory circuitry 14) and/or performed by control circuitry in server 32 (e.g., performed by processing circuitry 34 for server 32 by executing software instructions stored on memory circuitry 36). If desired, one or more operations described in connection with FIG. 3 may be performed by other dedicated hardware components in access point 10 and server 32.

At block 220, network access management server 32 may obtain and store location information of a client device 20 and/or other information about client device 20 based on a group-specific key used for network authentication at a given access point 10.

At block 222, server 32 and/or access point 10 may supply content to the client device 20 based on the identified location and/or other information.

As illustrative examples, a client device 20 connected to a wireless network using the group-specific key may be supplied with content such as location-relevant information (e.g., a menu when at a restaurant, a train schedule when at a train station, etc.) and/or information indicative nearby points of interest (e.g., cafes, stores, restaurants, etc.). In particular, through the exchange of request and response messages 72 and 76 (FIGS. 5-10), server 32 may identify a location of access point 10 and consequently client device 20. Through the authentication of the client device 20, server 32 may obtain user and/or device information for client device 20 (e.g., stored at a user record 50 accessed during the authentication process). Accordingly, server 32 may provide curated location-based content to client device 20, may provide an indication to access point 10 to redirect client device 20 to curated location-based content (e.g., web pages displaying the curated content), and/or may provide an indication to other services or servers to supply curated location-based content to the client device, as examples.

The methods and operations described above in connection with FIGS. 1-15 may be performed by the components of one or more network devices and/or server or other host equipment using software, firmware, and/or hardware (e.g., dedicated circuitry or hardware). Software code for performing these operations may be stored on non-transitory computer-readable storage media (e.g., tangible computer readable storage media) stored on one or more of the components of the network device(s) and/or server or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable-storage media may be executed by processing circuitry on one or more of the components of the network device(s) and/or server or other host equipment (e.g., processing circuitry 34 in server 32 of FIG. 1, processing circuitry 12 in access point 10 in FIG. 2, etc.).

The foregoing is merely illustrative and various modifications can be made to the described embodiments. The foregoing embodiments may be implemented individually or in any combination.

What is claimed is:

1. A method of providing network access to a client device, the method comprising:

receiving, by an access point, a message from the client device;

sending, by the access point, a request message destined for a network access management server;

receiving, by the access point, a response message from the network access management server, the response message containing a group-specific key usable to authenticate the client device and any additional client devices within a same device group for network access;

prior to receiving the message from the client device and prior to sending the request message, redirecting the client device to access, via the access point, an authentication service, and providing, by the access point, the group-specific key to the client device after successful authentication using the authentication service; and completing a key exchange operation with the client device using the group-specific key to obtain a session key for conveying network traffic between the client device and the access point.

2. The method defined in claim 1, wherein the group-specific key is a pre-shared key (PSK) unique to the device group and wherein the session key is a pairwise transient key (PTK) usable to encrypt and decrypt the network traffic conveyed between the client device and the access point.

3. The method defined in claim 2, wherein the device group is a user device group, wherein each client device in the device group is associated with a same user, and wherein the PSK is unique to the user.

4. The method defined in claim 3, wherein the request message includes a client device identifier of the client device and wherein the response message includes role information for the user.

5. The method defined in claim 1, wherein the group-specific key is encrypted in the received response message.

6. The method defined in claim 1, wherein the message received from the client device is a first authentication message based on a Simultaneous Authentication of Equals (SAE) protocol, the method further comprising:

sending, by the access point, a second authentication message based on the SAE protocol, wherein sending the request message and receiving the response message occurs before sending the second authentication message and occurs after receiving the first authentication message.

7. The method defined in claim 6, wherein the first authentication message is a first authentication commit message based on the SAE protocol and the second authentication message is a second authentication commit message based on the SAE protocol, the method further comprising:

receiving, by the access point, a first authentication confirm message based on the SAE protocol from the client device; and sending, by the access point, a second authentication confirm message based on the SAE protocol destined for the client device, wherein the key exchange operation occurs after sending the second authentication confirm message.

8. The method defined in claim 1, wherein the message received from the client device is a first message for the key exchange operation and wherein completing the key exchange operation comprises receiving, by the access point, a second message for the key exchange operation.

9. The method defined in claim 8 further comprising:

sending, by the access point, a third message to the client device for the key exchange operation prior to sending the request message; and sending, by the access point, a fourth message to the client device for the key exchange operation after receiving the response message.

10. The method defined in claim 9, wherein the key exchange operation is based on an Extensible Authentication Protocol (EAP).

11. The method defined in claim 1, wherein the request message includes a cryptographic checksum generated using the group-specific key and one or more inputs used to generate the cryptographic checksum.

12. The method defined in claim 1 further comprising:

prior to redirecting the client device to access the authentication service:

sending, by the access point, an additional request message to the network access management server, receiving, by the access point, an additional response message from the network access management server, the additional response message containing an onboarding key usable to authenticate the client device and an indication to redirect the client device to the authentication service, and completing an additional key exchange operation with the client device using the onboarding key.

13. One or more non-transitory computer-readable storage media comprising computer-executable instructions that, when executed by one or more processors for a wireless access point, cause the one or more processors to:

communicatively connect to a client device;

obtain a user-specific pre-shared key (PSK) usable to authenticate network access for the client device by:

sending a request message that includes an identifier of the client device to a network access management server that includes a user record containing the user-specific PSK but lacking the identifier of the client device in the user record, and receiving, from the network access management server, a response message that includes the user-specific PSK; and obtain a session key based on an exchange of messages with the client device using the user-specific PSK, wherein the session key is usable to encrypt network traffic associated with the client device.

14. The one or more non-transitory computer-readable storage media defined in claim 13, wherein the user-specific PSK is usable to authenticate network access for any client device associated with a given user but not for any other client devices.

15. The one or more non-transitory computer-readable storage media defined in claim 13, wherein the user-specific PSK is assigned by the network access management server and obtained from the response message received from the network access management server.

16. The one or more non-transitory computer-readable storage media defined in claim 13 further comprising computer-executable instructions that, when executed by the one or more processors, cause the one or more processors to:

communicatively connect to an additional client device, the client device and the additional client device being associated with a same user;

obtain the user-specific PSK, wherein the user-specific PSK is usable to authenticate network access for the additional client device; and obtain an additional session key based on an exchange of messages with the additional client device using the user-specific PSK, wherein the additional session key is usable to encrypt network traffic associated with the additional client device.

17. The one or more non-transitory computer-readable storage media defined in claim 13 further comprising computer-executable instructions that, when executed by the one or more processors, cause the one or more processors to:

communicatively connect to an additional client device, the client device being associated with a first user and the additional client device being associated with a second user;

obtain an additional user-specific PSK usable to authenticate network access for the additional client device; and obtain an additional session key based on an exchange of messages with the additional client device using the additional user-specific PSK, wherein the additional session key is usable to encrypt network traffic associated with the additional client device.

18. The one or more non-transitory computer-readable storage media defined in claim 13, wherein the user record is associated with an onboarded user and wherein the client device is a new client device of the onboarded user.

19. One or more non-transitory computer-readable storage media comprising computer-executable instructions that, when executed by one or more processors for a network device, cause the one or more processors to:

authenticate network access for a client device based on an onboarding key, wherein the onboarding key is a common pre-shared key (PSK);

redirect the client device to an authentication service based on the network access being authenticated based on the onboarding key; and authenticate network access for the client device based on a key unique to a client device group containing the client device after the redirection of the client device to the authentication service, wherein the key unique to the client device group is a client-device-group-specific PSK.

20. The one or more non-transitory computer-readable storage media defined in claim 19 further comprising computer-executable instructions that, when executed by the one or more processors for the network device, cause the one or more processors to:

authenticate network access for an additional client device based on the onboarding key;

redirect the additional client device to the authentication service based on the network access for the additional client device being authenticated based on the onboarding key; and authenticate network access for the additional client device based on an additional key unique to an additional client device group containing the additional client device after the redirection of the additional client device to the authentication service.

* * * * *